US007760955B2

(12) United States Patent
Liege et al.

(10) Patent No.: US 7,760,955 B2
(45) Date of Patent: Jul. 20, 2010

(54) METHOD AND SYSTEM FOR PRODUCING FORMATTED INFORMATION RELATED TO DEFECTS OF APPLIANCES

(75) Inventors: Bruno Liege, Boulogne (FR); Frederic Guichard, Paris (FR)

(73) Assignee: DO Labs, Boulogne (FR)

( * ) Notice: Subject to any disclaimer, the term of this patent is extended or adjusted under 35 U.S.C. 154(b) by 1298 days.

(21) Appl. No.: 10/483,322

(22) PCT Filed: Jun. 5, 2002

(86) PCT No.: PCT/FR02/01914

§ 371 (c)(1),
(2), (4) Date: Jun. 28, 2004

(87) PCT Pub. No.: WO03/007241

PCT Pub. Date: Jan. 23, 2003

(65) Prior Publication Data
US 2005/0008242 A1     Jan. 13, 2005

(30) Foreign Application Priority Data

Jul. 12, 2001 (FR) .................................. 01 09291
Jul. 12, 2001 (FR) .................................. 01 09292

(51) Int. Cl.
*G06K 9/40* (2006.01)
(52) U.S. Cl. ................. 382/254; 382/100; 382/255; 382/274; 382/275; 358/1.6
(58) Field of Classification Search ............... 382/275, 382/274, 269
See application file for complete search history.

(56) References Cited

U.S. PATENT DOCUMENTS 5,353,392 A    10/1994   Luquet et al.
(Continued)

FOREIGN PATENT DOCUMENTS

EP    867 690    9/1998
(Continued)

OTHER PUBLICATIONS

Reg G. Willson, "Modeling and calibration of automated zoom lenses", Oct. 1994, Proceedings of SPIE, vol. 2350, pp. 170-186.*
(Continued)

*Primary Examiner*—Matthew C Bella
*Assistant Examiner*—Eric Rush
(74) *Attorney, Agent, or Firm*—Oblon, Spivak, McClelland, Maier & Neustadt, L.L.P.

(57) ABSTRACT

A method and a system for producing formatted information related to defects of appliances of a chain of appliances. To produce the formatted information related to the defects of an image-capture appliance of the chain, the method includes a first calculation algorithm with which there can be chosen, within a set of parameterizable transformation models, within a set of parameterizable reverse transformation models, within a set of synthesis images, within a set of reference scenes, and within a set of transformed images: a reference scene, and/or a transformed image, and/or a parameterizable transformation model, with which a reference image of the reference scene can be transformed to the transformed image, and/or a parameterizable reverse transformation model, with which the transformed image can be transformed to the reference image, and/or a synthesis image obtained from the reference scene and/or obtained from the reference image. The formatted information is at least partly composed of the parameters of the chosen parameterizable transformation model and/or of the parameters of the chosen parameterizable reverse transformation model.

43 Claims, 8 Drawing Sheets

U.S. PATENT DOCUMENTS

| | | | |
|---|---|---|---|
| 5,694,484 A * | 12/1997 | Cottrell et al. | 382/167 |
| 6,011,547 A * | 1/2000 | Shiota et al. | 382/254 |
| 6,100,925 A | 8/2000 | Dicicco et al. | |
| 6,115,104 A * | 9/2000 | Nakatsuka | 355/40 |
| 6,173,087 B1 | 1/2001 | Kumar et al. | |
| 6,273,535 B1 * | 8/2001 | Inoue et al. | 347/3 |
| 6,809,837 B1 * | 10/2004 | Mestha et al. | 358/1.9 |
| 6,937,370 B1 * | 8/2005 | Nitta et al. | 358/518 |
| 2001/0014180 A1 * | 8/2001 | Ejiri et al. | 382/275 |

FOREIGN PATENT DOCUMENTS

| | | |
|---|---|---|
| EP | 964 353 | 12/1999 |
| EP | 1 104 175 | 5/2001 |
| JP | 11-275348 | 10/1999 |
| JP | 2002158915 A * | 5/2002 |
| WO | 01/01672 | 1/2001 |
| WO | 01/35052 | 5/2001 |

OTHER PUBLICATIONS

U.S. Appl. No. 10/482,413, filed Jan. 12, 2004, Liege et al.
U.S. Appl. No. 10/483,253, filed Jan. 12, 2004, Chauville et al.
U.S. Appl. No. 10/482,419, filed Jan. 12, 2004, Chauville et al.
U.S. Appl. No. 10/483,252, filed Jan. 12, 2004, Chauville et al.
U.S. Appl. No. 10/483,495, filed Jan. 12, 2004, Chanas et al.
U.S. Appl. No. 10/483,496, filed Jan. 12, 2004, Chanas et al.
U.S. Appl. No. 10/483,494, filed Jan. 12, 2004, Liege et al.
U.S. Appl. No. 10/483,497, filed Jan. 12, 2004, Liege et al.
Mikio Watanabe, et al., "An Image Data File Format for Digital Still Camera", Final Program and Advance Printing of Papers. Annual Conference. Imaging on the Information Superhighway, pp. 421-424 1995.
Clunie, D.:"Medical image format FAQ—part 3. Proprietary formats", Jun. 3, 2001.
U.S. Appl. No. 12/097,886, filed Jun. 18, 2008, Liege.
U.S. Appl. No. 12/158,129, filed Aug. 22, 2008, Liege.
U.S. Appl. No. 12/097,893, filed Jun. 18, 2008, Liege.

* cited by examiner

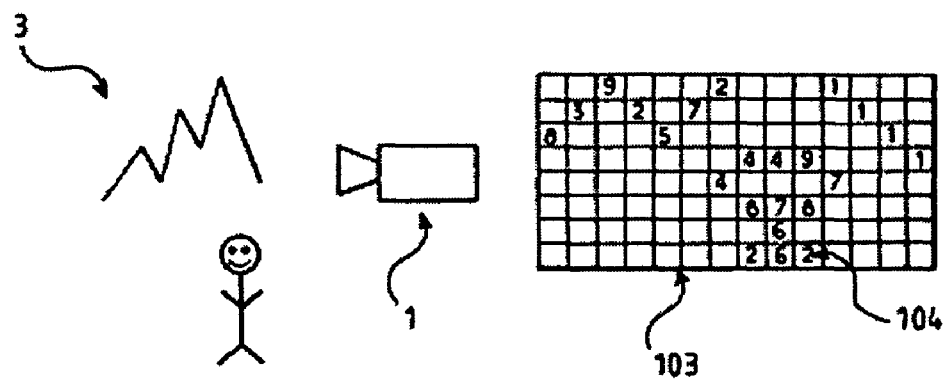
FIG_3
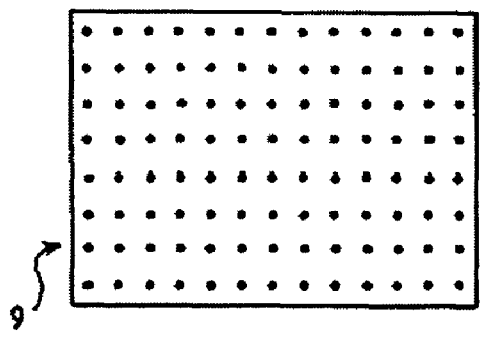
FIG_4a
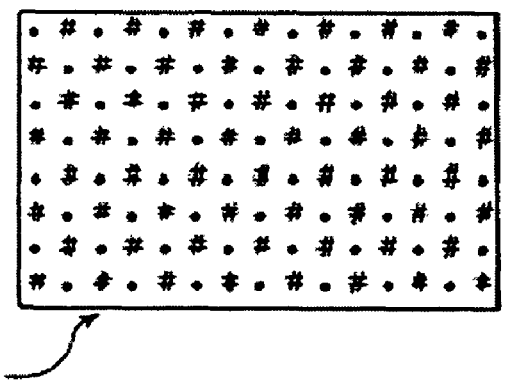
FIG_4b

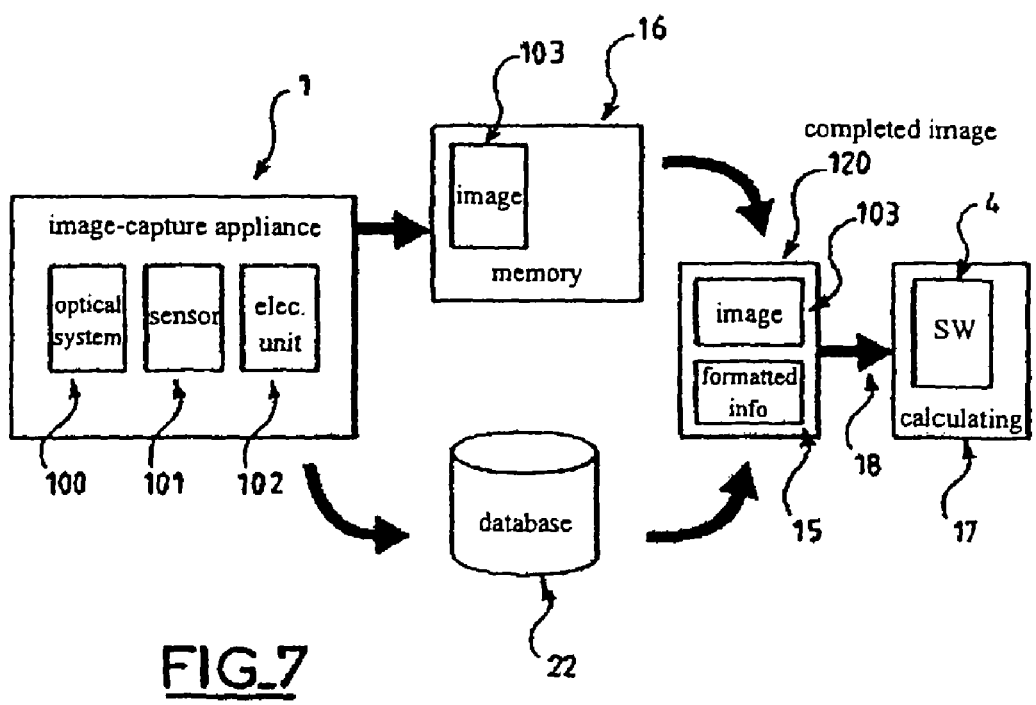
FIG_7
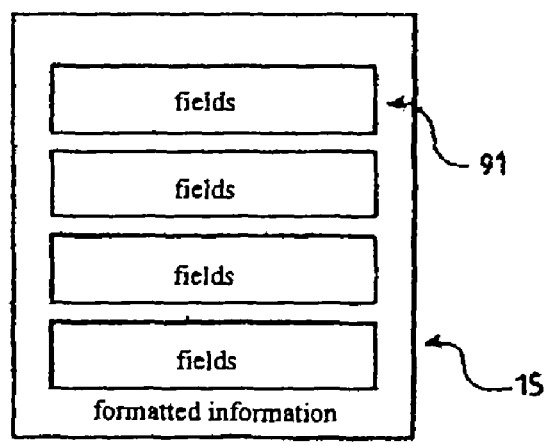
FIG_8

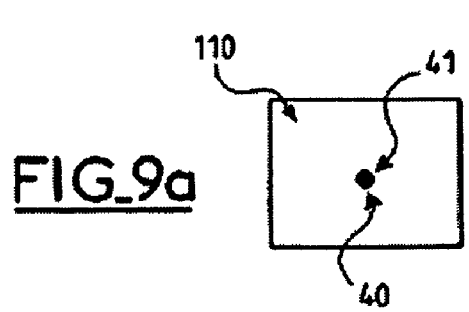
FIG_9a
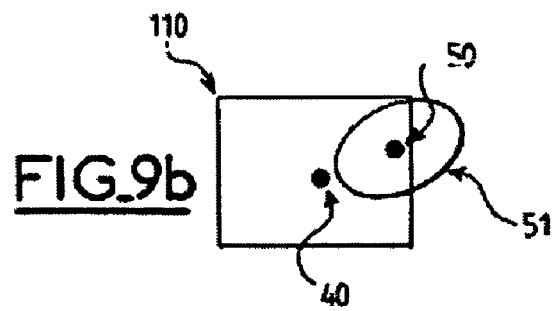
FIG_9b
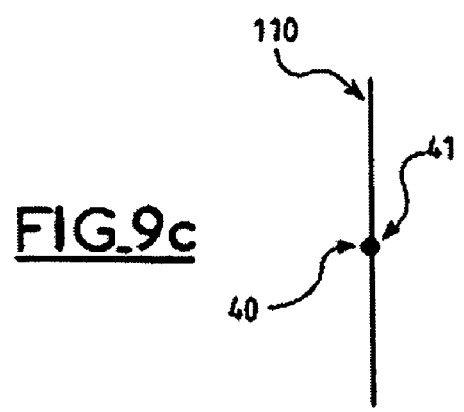
FIG_9c
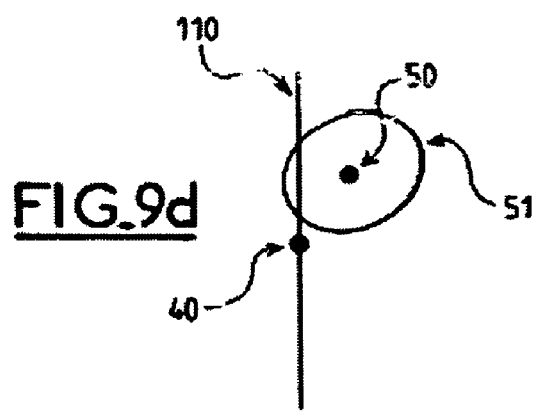
FIG_9d
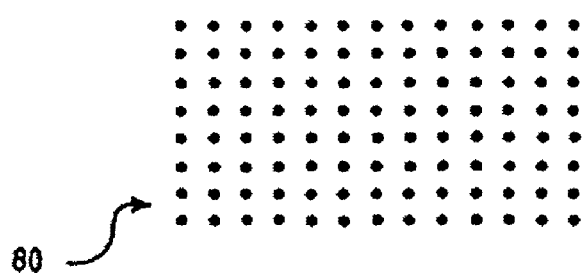
FIG_10

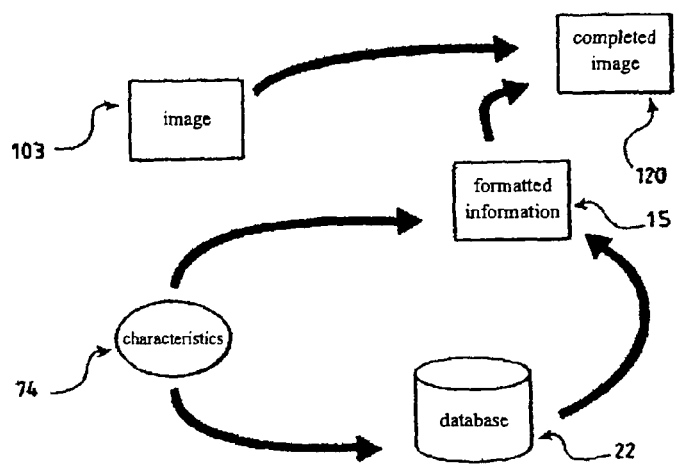
FIG_11
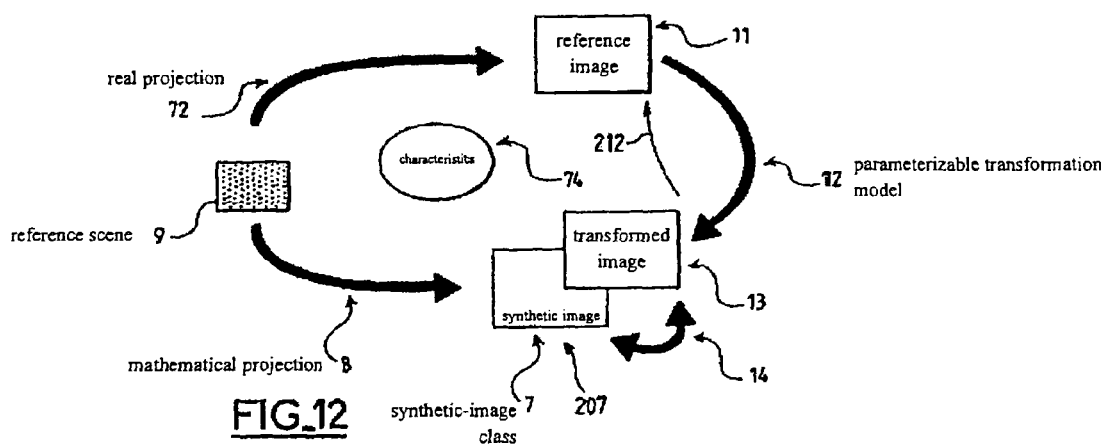
FIG_12

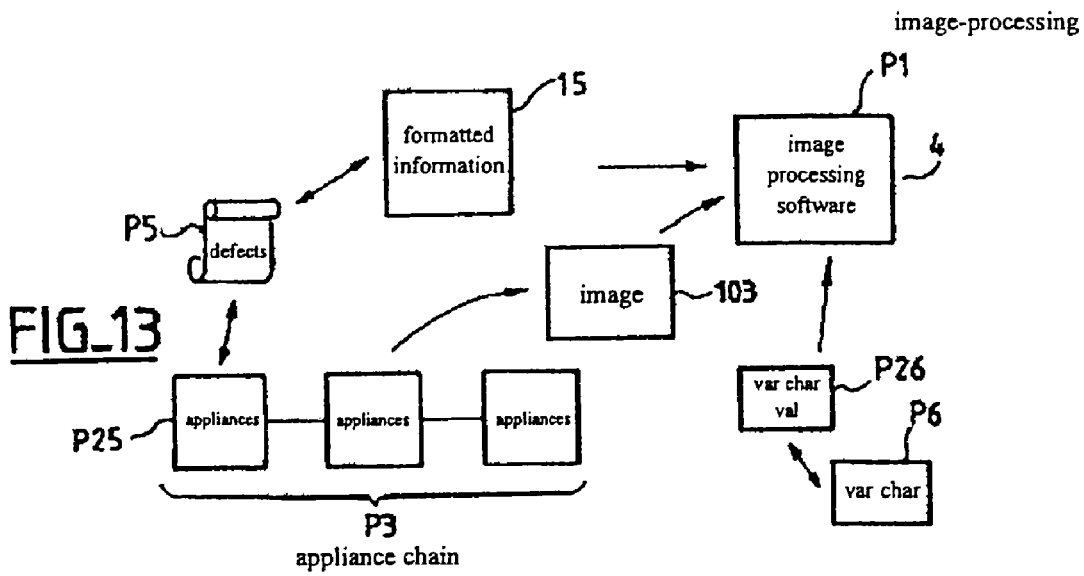
FIG_13
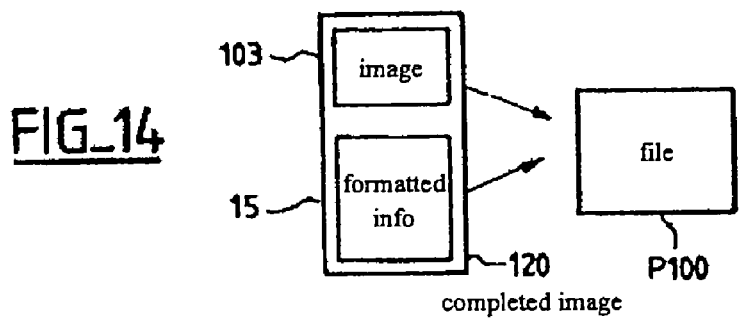
FIG_14
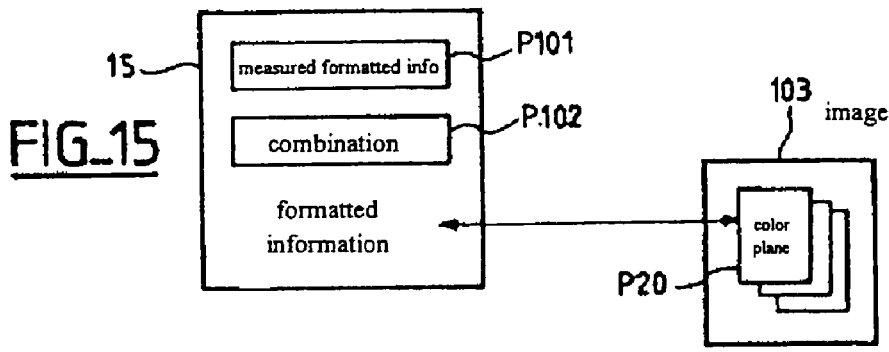
FIG_15
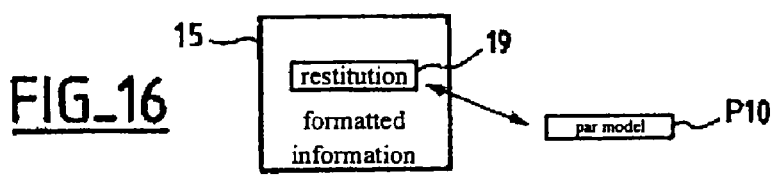
FIG_16

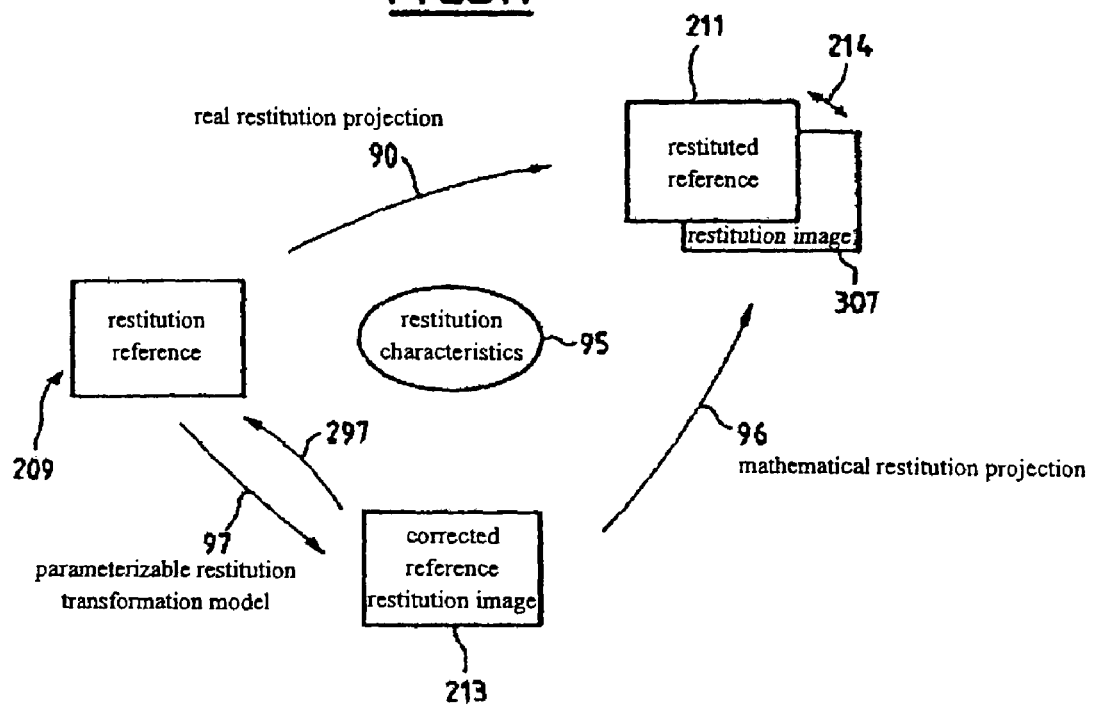
FIG_17

METHOD AND SYSTEM FOR PRODUCING FORMATTED INFORMATION RELATED TO DEFECTS OF APPLIANCES

BACKGROUND

Preamble of the Description

Field in Question, Problem Posed

The present invention relates to a method and a system for producing formatted information related to defects of appliances of an appliance chain. The present invention also relates to the formatted information obtained in this way and addressed to image-processing means.

SUMMARY

Solution

Method

The invention relates to a method for producing formatted information related to the defects of appliances of an appliance chain. The formatted information is addressed to image-processing means, especially software, for the purpose of modifying the quality of images processed by the image-processing means. The appliance chain includes in particular at least one image-capture appliance and/or at least one restitution means and/or at least one observer. The method includes the stage of producing data characterizing the defects of appliances of the appliance chain. The data are referred to hereinafter as the formatted information.

Image-capture Appliance

The appliance chain includes at least one image-capture appliance, especially a scanner. In a preferred embodiment according to the invention, the method is more particularly designed in this case to produce formatted information related to defects of the image-capture appliance. The method additionally includes the stage of producing data characterizing the defects of the image-capture appliance, especially the sharpness characteristics. The formatted information also includes the data characterizing the defects of the image-capture appliance.

The appliance chain includes at least one image-capture appliance. To produce the formatted information related to defects of the image-capture appliance, especially the distortion characteristics, preferably, according to the invention, the method includes a first algorithm for calculating the formatted information. By means of this first calculation algorithm, it is possible to make a choice:

within a set of parameterizable transformation models,
within a set of parameterizable reverse transformation models, within a set of synthetic images,
within a set of reference scenes and within a set of transformed images.

This choice is based on:
a reference scene, and/or
a transformed image, and/or
a parameterizable transformation model with which the reference image obtained by capturing the reference scene by means of the image-capture appliance can be transformed to the transformed image, and/or
a parameterizable reverse transformation model with which the transformed image can be transformed to the reference image, and/or
a synthetic image obtained from the reference scene and/or obtained from the reference image.

The choice is made in such a way that the transformed image is close to the synthetic image. The transformed image exhibits a deviation compared with the synthetic image.

The formatted information is at least partly composed of the parameters of the chosen parameterizable transformation model and/or of the parameters of the chosen parameterizable reverse transformation model.

Preferably, according to the invention, it is possible by means of the first calculation algorithm to choose, within a set of mathematical projections, one mathematical projection with which the synthetic image can be constructed from the reference scene.

The appliance chain includes at least one image-capture appliance. Preferably, according to another alternative embodiment of the invention, to produce the formatted information related to defects of the image-capture appliance, especially the distortion characteristics, the method includes a second algorithm for calculating the formatted information. This second algorithm includes the stages of:

choosing at least one reference scene,
capturing at least one reference image of each reference scene by means of the image-capture appliance.

This second algorithm additionally includes the stage of choosing, within a set of parameterizable transformation models and within a set of synthetic images:

a parameterizable transformation model with which the reference image can be transformed to a transformed image, and/or
a synthetic image obtained from the reference scene and/or obtained from the reference image, such that the synthetic image is close to the transformed image. The transformed image exhibits a deviation compared with the synthetic image. The formatted information is at least partly composed of the parameters of the chosen parameterizable transformation model and/or of the parameters of the parameterizable reverse transformation model. By means of the parameterizable reverse transformation model, the transformed image can be transformed to the reference image.

Preferably, according to the invention, it is possible by means of the second calculation algorithm to choose, within a set of mathematical projections, one mathematical projection with which the synthetic image can be constructed from the reference scene.

Preferably, according to the invention, the method includes a third algorithm for calculating the deviations. This third algorithm for calculating the deviations includes the stages of:

calculating the deviations between the transformed image and the synthetic image,
associating the deviations with the formatted information.

The appliance chain includes at least one image-capture appliance. The image or images are images of scenes, especially of animated scenes captured by a user by means of the image-capture appliance. Preferably, according to this other alternative embodiment of the invention, to produce the formatted information related to defects of the image-capture appliance, especially the distortion characteristics, the method includes a fourth algorithm for calculating the formatted information. This fourth algorithm includes the stages of:

constructing a synthetic-image class by specified mathematical projections of at least one reference scene onto a surface, capturing at least one reference image of at least one reference scene by means of the image-capture appliance, choosing, within a set of parameterizable transformation models, that with which the reference image can be transformed to a transformed image close to the synthetic-image class of the reference scene.

The transformed image exhibits a deviation compared with the synthetic-image class. The formatted information is at least partly composed of the parameters of the chosen parameterizable transformation models.

Preferably, according to the invention, the method includes a fifth algorithm for calculating the deviations. This fifth algorithm includes the stages of:

calculating the deviations between the transformed image and the synthetic-image class associating the deviations with the formatted information.

Variable Focal Length—Image-capture Appliance

The image-capture appliance of the appliance chain is provided with at least one variable characteristic depending on the image, especially the focal length and/or the aperture. A fraction of the formatted information is related to the defects of the image-capture appliance provided with the variable characteristic or characteristics. Each variable characteristic can be associated with a value to form a combination composed of the set of variable characteristics and values. Preferably in this case, according to the invention, the method additionally includes the stage of producing the fraction of the said formatted information for a predetermined selection of the said combinations. The formatted information obtained in this way in the said fraction of formatted information is entered in the field of formatted information. This formatted information is referred to hereinafter as the measured formatted information.

Preferably, according to the invention, the method includes the stage of obtaining the fraction of formatted information related to an arbitrary combination from measured formatted information. The fraction of formatted information related to an arbitrary combination is referred to hereinafter as extended formatted information.

The formatted information can include the extended formatted information instead of and in place of measured formatted information.

The measured formatted information and the said extended formatted information may exhibit an interpolation deviation. Preferably, according to the invention, the method additionally includes the stage of selecting zero or one or more variable characteristics, in such a way that the interpolation deviation for the extended formatted information obtained for the variable characteristics selected in this way is below a predetermined interpolation threshold. It results from the combination of technical features that the modification of image quality employs simple calculations. It also results from the combination of technical features that the extended formatted information is compact. It also results from the combination of technical features that the eliminated variable characteristics have the least influence on the defect.

Image-restitution Means

The appliance chain can include at least one image-restitution means, especially a printer or a visual display screen. The method is designed additionally to provide, to image-processing means, especially software, formatted information related to the defects of the image-restitution means. Preferably in this case, according to the invention, the method additionally includes the stage of producing data characterizing the defects of the image-restitution means, especially the distortion characteristics. The formatted information also includes data characterizing the defects of the restitution means.

The appliance chain includes at least one image-restitution means. Preferably, according to the invention, to produce the formatted information related to defects of the image-restitution means, especially the distortion characteristics; the method includes a sixth algorithm for calculating the formatted information. By means of this sixth algorithm, it is possible to make a choice:

within a set of parameterizable restitution transformation models, within a set of parameterizable reverse restitution transformation models, within a set of mathematical restitution projections, within a set of restitution references and within a set of corrected reference restitution images.

The choice made by this sixth algorithm is based on:

a restitution reference, and/or a corrected reference restitution image, and/or a parameterizable restitution transformation model with which the restitution reference can be transformed to the corrected reference restitution image, and/or a parameterizable reverse restitution transformation model with which the corrected reference restitution image can be transformed to the restitution reference, and/or a mathematical restitution projection with which a synthetic restitution image can be constructed from the corrected reference restitution image.

The choice is made by this sixth algorithm in such a way that the synthetic restitution image is close to the restituted reference obtained by restitution of the restitution reference by means of the image-restitution means. The restituted reference exhibits a restitution deviation compared with the synthetic restitution image. The formatted information is at least partly composed of the parameters of the chosen parameterizable restitution transformation model and/or of the parameters of the chosen parameterizable reverse restitution transformation model.

The appliance chain includes at least one image-restitution means. Preferably in this case, according to an alternative embodiment of the invention, to produce the formatted information related to the defects of the image-restitution means, especially the distortion characteristics, the method includes a seventh algorithm for calculating the formatted information. This seventh algorithm includes the stages of:

choosing at least one restitution reference, restituting the restitution reference to a restituted reference by means of the image-restitution means.

By means of this seventh algorithm it is also possible to choose, within a set of parameterizable restitution transformation models and within a set of mathematical restitution projections:

a parameterizable restitution transformation model with which the restitution reference can be transformed to a corrected reference restitution image, and a mathematical restitution projection with which a synthetic restitution image can be constructed from the corrected reference restitution image.

The choice is made by the seventh algorithm in such a way that the synthetic restitution image is close to the restituted reference. The restituted reference exhibits a restitution deviation compared with the synthetic restitution image. The formatted information is at least partly composed of the parameters of the chosen parameterizable restitution transformation model and/or of the parameters of the parameterizable reverse restitution transformation model. By means of the parameterizable reverse restitution transformation model, it is possible to transform the corrected reference restitution image to the restitution reference.

The appliance chain includes at least one image-restitution means. Preferably, according to this other alternative embodiment of the invention, to produce the formatted information related to the defects of the image-restitution means, especially the distortion characteristics, the method includes an eighth algorithm for calculating the formatted information. This eighth algorithm includes the stage of choosing a corrected reference restitution image. This eighth algorithm also includes the stager of making a choice within a set of parameterizable restitution transformation models, within a set of mathematical restitution projections and within a set of restitution references. This choice is based on:

a restitution reference, and/or a parameterizable restitution transformation model with which the restitution reference can be transformed to the corrected reference restitution image, and/or a parameterizable reverse restitution transformation model with which the corrected reference restitution image can be transformed to the restitution reference, and/or a mathematical restitution projection with which a synthetic restitution image can be constructed from the corrected reference restitution image.

The eighth algorithm makes this choice in such a way that the synthetic restitution image is close to the restituted reference obtained by restitution of the restitution reference by means of the image-restitution means. The restituted reference exhibits a restitution deviation compared with the synthetic restitution image. The formatted information is at least partly composed of the parameters of the chosen parameterizable restitution transformation model and/or of the parameters of the chosen parameterizable reverse restitution transformation model.

Preferably, according to the invention, the method includes a ninth algorithm for calculating the restitution deviations. This ninth algorithm includes the stages of:

calculating the restitution deviations between the restituted reference and the synthetic restitution image, associating the restitution deviations with the said formatted information.

It results from the combination of technical features that it is possible to verify automatically, for example during manufacture of the appliance, that the method has produced formatted information within acceptable tolerances.

Variable Focal Length—Image-restitution Means

The image-restitution means of the appliance chain can be provided with at least one variable restitution characteristic depending on the image, especially the focal length and/or the aperture. A fraction of the formatted information is related to the defects of the image-restitution means provided with the variable restitution characteristic or characteristics. Each variable restitution characteristic can be associated with a value to form a restitution combination composed of the set of variable restitution characteristics and values. Preferably in this case, according to the invention, the method additionally includes the stage of producing the fraction of the formatted information for a predetermined selection of the restitution combinations. The formatted information obtained in this way in the fraction and entered in the field of formatted information is referred to hereinafter as the measured formatted restitution information.

Preferably, according to the invention, the method includes the stage of obtaining the fraction of formatted information related to an arbitrary combination from measured formatted restitution information. The fraction of formatted information related to an arbitrary restitution combination is referred to hereinafter as extended formatted restitution information.

The formatted information can include the extended formatted restitution information instead of and in place of measured formatted restitution information.

The measured formatted restitution information and the said extended formatted restitution information can exhibit a restitution interpolation deviation. Preferably in this case, according to the invention, the method additionally includes the stage of selecting zero or one or more variable restitution characteristics, in such a way that the restitution interpolation deviation for the extended formatted restitution information obtained for the variable restitution characteristics selected in this way is below a predetermined restitution interpolation threshold. It results from the combination of technical features that the modification of image quality employs simple calculations. It also results from the combination of technical features that the extended formatted restitution information is compact. It also results from the combination of technical features that the eliminated variable restitution characteristics have the least influence on the defect.

Preferably, according to the invention, the restitution means is associated with an image-capture appliance to restitute, in digital form, the restituted reference from the restitution reference. The method is such that, to produce the formatted information related to the defects of the restitution means, there is used the formatted information related to the image-capture appliance associated with the restitution means.

The appliance chain includes at least two appliances. Preferably in this case, according to the invention, to produce formatted information related to the defects of the appliances of the appliance chain, the method additionally includes the following stages:

the stage of producing formatted information related to each of the appliances of the appliance chain, the stage of combining the formatted information related to each of the appliances of the appliance chain, in order to obtain formatted information related to the appliance chain.

System

The invention relates to a system for producing formatted information related to the defects of appliances of an appliance chain. The formatted information is addressed to image-processing means, especially software, for the purpose of modifying the quality of images processed by the image-processing means. The appliance chain includes in particular at least one image-capture appliance and/or at least one restitution means and/or at least one observer. The system includes data-processing means for producing data characterizing the defects of appliances of the appliance chain. The data are referred to hereinafter as the formatted information.

Image-capture Appliance

The appliance chain includes at least one image-capture appliance, especially a scanner. Preferably in this case, according to the invention, the system is more particularly designed to produce formatted information related to defects of the image-capture appliance. The system includes data-processing means for producing data characterizing the defects of the image-capture appliance, especially the sharpness characteristics. The formatted information also includes the data characterizing the defects of the image-capture appliance.

The appliance chain includes at least one image-capture appliance. Preferably, according to the invention, to produce the formatted information related to defects of the image-capture appliance, especially the distortion characteristics, the data-processing means are capable of employing a first algorithm for calculating the formatted information. By means of the data-processing means employing the first calculation algorithm, it is possible to make a choice within a set of parameterizable transformation models, within a set of parameterizable reverse transformation models, within a set of synthetic images, within a set of reference scenes and within a set of transformed images.

This choice is based on:
a reference scene, and/or
a transformed image, and/or
a parameterizable transformation model with which the reference image obtained by capturing the reference scene by means of the image-capture appliance can be transformed to the transformed image, and/or
a parameterizable reverse transformation model with which the transformed image can be transformed to the reference image, and/or
a synthetic image obtained from the reference scene and/or obtained from the reference image.

The data-processing means make this choice in such a way that the transformed image is close to the synthetic image. The transformed image exhibits a deviation compared with the synthetic image. The formatted information is at least partly composed of the parameters of the chosen parameterizable transformation model and/or of the parameters of the chosen parameterizable reverse transformation model.

Preferably, according to the invention, the data-processing means employing the first calculation algorithm include calculating means for choosing, within a set of mathematical projections, one mathematical projection with which the synthetic image can be constructed from the reference scene.

The appliance chain includes at least one image-capture appliance. Preferably, according to an alternative embodiment of the invention, to produce the formatted information related to defects of the image-capture appliance, especially the distortion characteristics, the data-processing means employ a second algorithm for calculating the formatted information. The data-processing means employing the second calculation algorithm include calculating means for choosing at least one reference scene. By means of the image-capture appliance, it is possible to capture at least one reference image of each reference scene. By means of the calculating means it is additionally possible to make a choice, within a set of parameterizable transformation models and within a set of synthetic images:
of a parameterizable transformation model with which the reference image can be transformed to a transformed image, and/or
of a synthetic image obtained from the reference scene and/or obtained from the reference image.

The calculating means make this choice in such a way that the synthetic image is close to the transformed image. The transformed image exhibits a deviation compared with the synthetic image. The formatted information is at least partly composed of the parameters of the chosen parameterizable transformation model and/or of the parameters of the parameterizable reverse transformation model. By means of the parameterizable reverse transformation model, the transformed image can be transformed to the reference image.

Preferably, according to the invention, the calculating means with which the second calculation algorithm can be employed include specific calculating means for choosing, within a set of mathematical projections, one mathematical projection with which the synthetic image can be constructed from the reference scene.

Preferably, according to the invention, the data-processing means are capable of employing a third algorithm for calculating the deviations. For this purpose, the data-processing means include calculating means appropriate for:
calculating the deviations between the transformed image and the synthetic image,
associating the deviations with the said formatted information.

Preferably, according to another alternative embodiment of the invention, the system is such that, to calculate the formatted information related to an image-capture appliance of the appliance chain, it additionally uses at least one reference scene. The image-capture appliance constructs a reference image for each reference scene. To calculate the formatted information relative to the image-capture appliance, the system additionally includes calculating and processing means for:
constructing a synthetic-image class by specified mathematical projections of at least one reference scene onto a surface,
choosing, within a set of parameterizable transformation models, that with which the reference image can be transformed to a transformed image close to the synthetic-image class of the reference scene.

The transformed image exhibits a deviation compared with the synthetic-image class. The formatted information is at least partly composed of the parameters of the chosen parameterizable transformation models.

Preferably, according to the invention, the system includes calculating means for:
calculating the deviations between the transformed image and the synthetic-image class,
associating the deviations with the said formatted information.

Variable Focal Length—Image-capture Appliance

Preferably, according to the invention, the system is such that the image-capture appliance of the appliance chain is provided with at least one variable characteristic depending on the image, especially the focal length and/or the aperture. A fraction of the formatted information is related to the defects of the image-capture appliance provided with the variable characteristic or characteristics. Each variable characteristic can be associated with a value to form a combination composed of the set of variable characteristics and values. The system additionally includes data-processing means for producing the fraction of the formatted information for a predetermined selection of the combinations. The formatted information obtained in this way in the fraction of formatted information and entered in the field of formatted information is referred to hereinafter as the measured formatted information.

Preferably, according to the invention, the data-processing means are capable of obtaining the fraction of formatted information related to an arbitrary combination from measured formatted information. The fraction of formatted information related to an arbitrary combination is referred to hereinafter as extended formatted information.

The formatted information can include the extended formatted information instead of and in place of measured formatted information.

The measured formatted information and the said extended formatted information exhibit an interpolation deviation. Preferably, according to the invention, the system additionally includes selection means for selecting zero or one or more variable characteristics, in such a way that the interpolation deviation for the extended formatted information obtained for the variable characteristics selected in this way is below a predetermined interpolation threshold.

Image-restitution Means

The appliance chain can include at least one image-restitution means, especially a printer or a visual display screen. The system is designed to provide, to image-processing means, especially software, formatted information related to the defects of the image-restitution means. Preferably in this case, according to the invention, the system additionally includes data-processing means for producing data characterizing the defects of the image-restitution means, especially the distortion characteristics. The formatted information also includes data characterizing the defects of the restitution means.

Preferably, in the case in which the appliance chain includes at least one image-restitution means, to produce the formatted information related to defects of the image-restitution means, especially the distortion characteristics, the system includes calculating means for making a choice:
within a set of parameterizable restitution transformation models,
within a set of parameterizable reverse restitution transformation models,
within a set of mathematical restitution projections,
within a set of restitution references and within a set of corrected reference restitution images.

The choice made by the calculating means is based on:
a restitution reference, and/or
a corrected reference restitution image, and/or
a parameterizable restitution transformation model with which the restitution reference can be transformed to the corrected reference restitution image, and/or
a parameterizable reverse restitution transformation model with which the corrected reference restitution image can be transformed to the restitution reference, and/or
a mathematical restitution projection with which a synthetic restitution image can be constructed from the corrected reference restitution image.

The calculating means make this choice in such a way that the synthetic restitution image is close to the restituted reference obtained by restitution of the restitution reference by means of the image-restitution means. The restituted reference exhibits a restitution deviation compared with the synthetic restitution image. The formatted information is at least partly composed of the parameters of the chosen parameterizable restitution transformation model and/or of the parameters of the chosen parameterizable reverse restitution transformation model.

The appliance chain can include at least one image-restitution means. Preferably in the case of this alternative embodiment according to the invention, to produce the formatted information related to the defects of the image-restitution means, especially the distortion characteristics, the system includes calculating means for choosing at least one restitution reference. By means of the image-restitution means, it is possible to restitute the restitution reference to a restituted reference. By means of the calculating means it is additionally possible to make a choice within a set of parameterizable restitution transformation models and within a set of mathematical restitution projections:
of a parameterizable restitution transformation model with which the restitution reference can be transformed to a corrected reference restitution image, and
of a mathematical restitution projection with which a synthetic restitution image can be constructed from the corrected reference restitution image.

The calculating means make this choice in such a way that the synthetic restitution image is close to the restituted reference. The restituted reference exhibits a restitution deviation compared with the synthetic restitution image. The formatted information is at least partly composed of the parameters of the chosen parameterizable restitution transformation model and/or of the parameters of the parameterizable reverse restitution transformation model. By means of the parameterizable reverse restitution transformation model, it is possible to transform the corrected reference restitution image to the restitution reference.

The appliance chain can include at least one image-restitution means. Preferably in the case of this alternative embodiment according to the invention, to produce the formatted information related to the defects of the image-restitution means, especially the distortion characteristics, the system includes calculating means for choosing a corrected reference restitution image. By means of the calculating means, it is additionally possible to make a choice within a set of parameterizable restitution transformation models, within a set of mathematical restitution projections and within a set of restitution references:
of a parameterizable restitution transformation model with which the specific restitution reference can be transformed to the corrected reference restitution image, and/or
of a parameterizable reverse restitution transformation model with which the corrected reference restitution image can be transformed to the restitution reference, and/or
of a mathematical restitution projection with which a synthetic restitution image can be constructed from the corrected reference restitution image.

The calculating means make this choice in such a way that the synthetic restitution image is close to the restituted reference obtained by restitution of the restitution reference by means of the image-restitution means. The restituted reference exhibits a restitution deviation compared with the synthetic restitution image. The formatted information is at least partly composed of the parameters of the chosen parameterizable restitution transformation model and/or of the parameters of the chosen parameterizable reverse restitution transformation model.

Preferably, according to the invention, the system includes calculating means for:
calculating the restitution deviations between the restituted reference and the synthetic restitution image,
associating the restitution deviations with the said formatted information.

Variable Focal Length—Image-restitution Means

The image-restitution means of the appliance chain can be provided with at least one variable restitution characteristic depending on the image, especially the focal length and/or the aperture. A fraction of the formatted information is related to the defects of the image-restitution means provided with the variable restitution characteristic or characteristics. Each variable restitution characteristic can be associated with a value to form a restitution combination composed of the set of variable restitution characteristics and values. Preferably in the case of this alternative embodiment according to the invention, the system additionally includes in this case data-processing means for producing the fraction of the formatted information for a predetermined selection of the restitution combinations. The formatted information obtained in this way in the fraction and entered in the field of formatted information is referred to hereinafter as the measured formatted restitution information.

Preferably, according to the invention, the system includes data-processing means for obtaining the fraction of formatted information related to an arbitrary combination from measured formatted restitution information. The formatted information making up the fraction of formatted information related to an arbitrary restitution combination is referred to hereinafter as extended formatted restitution information.

The formatted information can include the extended formatted restitution information instead of and in place of measured formatted restitution information.

The measured formatted restitution information and the said extended formatted restitution information exhibit a restitution interpolation deviation. Preferably in this case, according to the invention, the system additionally includes selection means for selecting zero or one or more variable restitution characteristics, in such a way that the restitution interpolation deviation for the extended formatted restitution information obtained for the variable restitution characteristics selected in this way is below a predetermined restitution interpolation threshold.

According to an alternative embodiment of the invention, the restitution means is associated with an image-capture appliance to restitute, in digital form, the restituted reference from the restitution reference. Preferably in this case, the system includes data-processing means for producing the formatted information related to the defects of the restitution means, by using the formatted information related to the image-capture appliance associated with the restitution means.

The appliance chain can include at least two appliances. Preferably in the case of this alternative embodiment of the invention, to produce formatted information related to the defects of the appliances of the appliance chain, the system additionally includes data-processing means for producing formatted information related to each of the appliances of the appliance chain and for combining the formatted information related to each of the appliances of the appliance chain, in such a way as to obtain formatted information related to the appliance chain.

BRIEF DESCRIPTION OF THE SEVERAL VIEWS OF THE DRAWINGS

Other characteristics and advantages of the invention will become apparent upon reading of the description of alternative embodiments of the invention, provided by way of indicative and non-limitative examples, and of the figures, wherein respectively:

FIG. 3 illustrates a schematic view of the pixels of an image,

FIGS. 4a and 4b illustrate two schematic views of a reference scene,

FIG. 7 illustrates a schematic view of the elements composing the system according to the invention, FIG. 8 illustrates a schematic view of fields of formatted information, FIG. 9a illustrates a schematic front view of a mathematical point, FIG. 9b illustrates a schematic front view of a real point of an image, FIG. 9c illustrates a schematic side view of a mathematical point, FIG. 9d illustrates a schematic profile view of a real point of an image, FIG. 10 illustrates a schematic view of an array of characteristic points, FIG. 11 illustrates the organizational diagram of the method with which the formatted information can be obtained, FIG. 12 illustrates the organizational diagram of the method with which the best transformation for an image-capture appliance can be obtained, FIG. 13 illustrates the organizational diagram of the method with which the quality of an image derived from or addressed to a chain of appliances can be modified, FIG. 14 illustrates an example of a file containing formatted information, FIG. 15 illustrates an example of formatted information, FIG. 16 illustrates a representation of parameters of parameterizable models, FIG. 17 illustrates an organizational diagram of the method with which the best transformation for an image-restitution appliance can be obtained.

DETAILED DESCRIPTION

Figure 1:
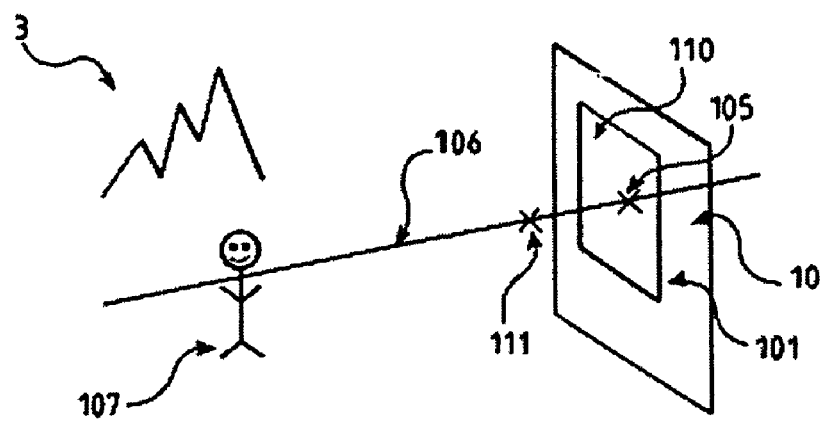
FIG. 1 illustrates a schematic view of image capture.

FIG. 1 illustrates a scene 3 containing an object 107, a sensor 101 and sensor surface 110, an optical center 111, an observation point 105 on a sensor surface 110, an observation direction 106 passing through observation point 105, optical center 111, scene 3, and a surface 10 geometrically associated with sensor surface 110.

Figure 2:
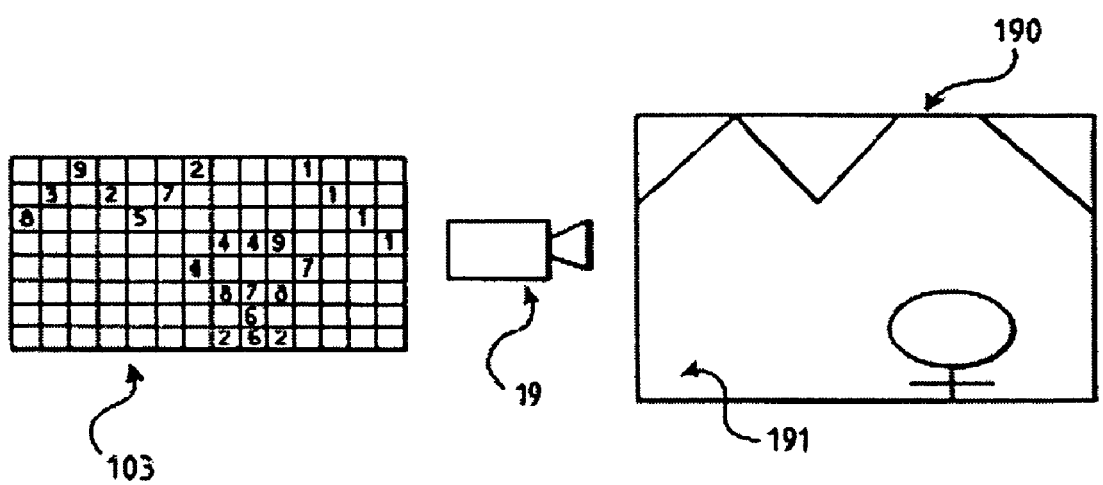
FIG. 2 illustrates a schematic view of image restitution.

FIG. 2 illustrates an image 103, an image-restitution means 19 and a restituted image 191 obtained on the restitution medium 190.

FIG. 3 illustrates a scene 3, an image-capture appliance 1 and an image 103 composed of pixels 104.

FIGS. 4a and 4b illustrate two alternative versions of a reference scene 9.

Figure 5:
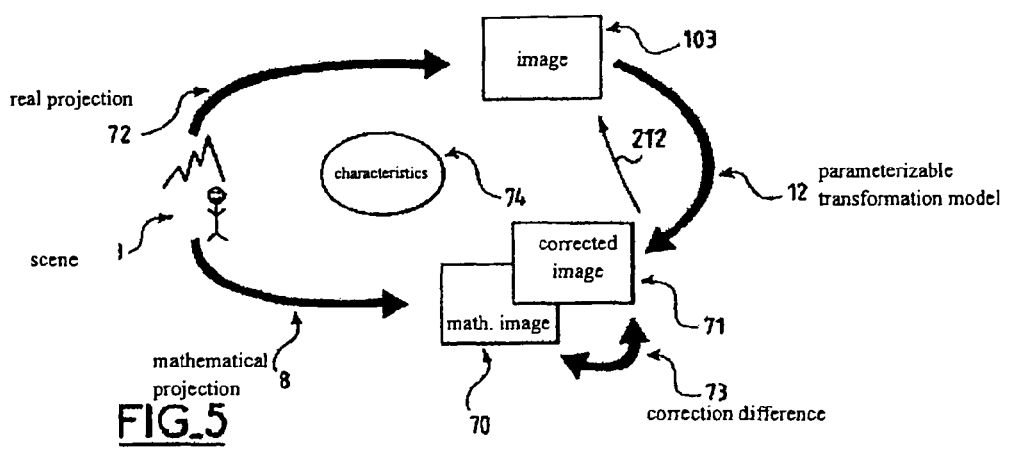
FIG. 5 illustrates the organizational diagram of the method with which the difference between the mathematical image and the corrected image can be calculated.

FIG. 5 illustrates an organizational diagram employing a scene 3, a mathematical projection 8 giving a mathematical image 70 of scene 3, a real projection 72 giving an image 103 of scene 3 for the characteristics 74 used, a parameterizable transformation model 12 giving a corrected image 71 of image 103, the corrected image 71 exhibiting a difference 73 compared with mathematical image 70.

Figure 6:
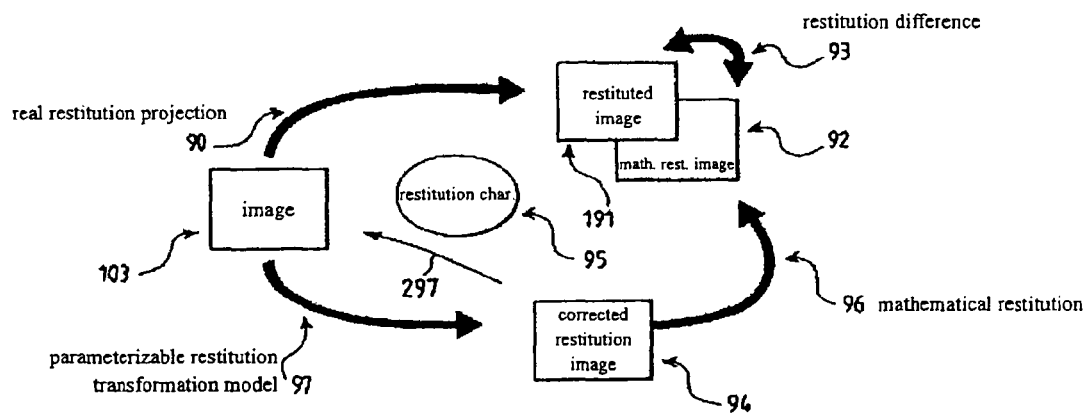
FIG. 6 illustrates the organizational diagram of the method with which the best restitution transformation for an image-restitution means can be obtained.

FIG. 6 illustrates an organizational diagram employing an image 103, a real restitution projection 90 giving a restituted image 191 of image 103 for the restitution characteristics 95 used, a parameterizable restitution transformation model 97 giving a corrected restitution image 94 of image 103, a mathematical restitution projection 96 giving a mathematical restitution image 92 of corrected restitution image 94 and exhibiting a restitution difference 93 compared with restituted image 191.

FIG. 7 illustrates a system comprising an image-capture appliance 1 composed of an optical system 100, of a sensor 101 and of an electronic unit 102. FIG. 7 also illustrates a memory zone 16 containing an image 103, a database 22 containing formatted information 15, and means 18 for transmission of completed image 120 composed of image 103 and formatted information 15 to calculating means 17 containing image-processing software 4.

FIG. 8 illustrates formatted information 15 composed of fields 91.

FIGS. 9a to 9d illustrate a mathematical image 70, an image 103, the mathematical position 40 of a point, and the mathematical shape 41 of a point, compared with the real position 50 and the real shape 51 of the corresponding point of the image.

FIG. 10 illustrates an array 80 of characteristic points.

FIG. 11 illustrates an organizational diagram employing an image 103, the characteristics 74 used, and a database 22 of characteristics. The formatted information 15 is obtained from the characteristics 74 used and stored in database 22. The completed image 120 is obtained from image 103 and formatted information 15.

FIG. 12 illustrates an organizational diagram employing a reference scene 9, a mathematical projection 8 giving a synthetic image class 7 of reference scene 9, and a real projection 72 giving a reference image 11 of reference scene 9 for the characteristics 74 used. This organizational diagram also employs a parameterizable transformation model 12 giving a transformed image 13 of reference image 11. Transformed image 13 exhibits a deviation 14 compared with synthetic image class 7.

FIG. 17 illustrates an organizational diagram employing a restitution reference 209, a real restitution projection 90 giving a restituted reference 211 of the said restitution reference 209 for the restitution characteristics 95 used, a parameterizable restitution transformation model 97 giving a corrected reference restitution image 213 of the said restitution reference 209, a parameterizable reverse restitution transformation model 297 producing the said restitution reference 209 from the said corrected reference restitution image 213. This organizational diagram also employs a mathematical restitution projection 96 giving a synthetic restitution image 307 of the corrected reference restitution image 213. The said synthetic restitution image 307 exhibits a restitution deviation 214 compared with the restituted reference 211.

DEFINITIONS AND DETAILED DESCRIPTION

Other characteristics and advantages of the invention will become apparent on reading:
of the definitions explained hereinafter of the employed technical terms, referring to the indicative and non-limitative examples of FIGS. 1 to 17,
of the description of FIGS. 1 to 17.

Scene

Scene 3 is defined as a place in three-dimensional space, containing objects 107 illuminated by light sources.

Image-capture Appliance, Image, Image Capture

Referring to FIGS. 3 and 7, a description will now be given of what is understood by image-capture appliance 1 and image 103. Image-capture appliance 1 is defined as an appliance composed of an optical system 100, of one or more sensors 101, of an electronic unit 102 and of a memory zone 16. By means of the said image-capture appliance 1, it is possible to obtain, from a scene 3, fixed or animated digital images 103 recorded in memory zone 16 or transmitted to an external device. Animated images are composed of a succession of fixed images 103 in time. The said image-capture appliance 1 can have the form in particular of a photographic appliance, of a video camera, of a camera connected to or integrated in a PC, of a camera connected to or integrated in a personal digital assistant, of a camera connected to or integrated in a telephone, of a videoconferencing appliance or of a measuring camera or appliance sensitive to wavelengths other than those of visible light, such as a thermal camera.

Image capture is defined as the method by which image 103 is calculated by image-capture appliance 1.

In the case in which an appliance is equipped with a plurality of interchangeable subassemblies, especially an optical system 100, image-capture appliance 1 is defined as a special configuration of the appliance.

Image-restitution Means, Restituted Image, Image Restitution

Referring to FIG. 2, a description will now be given of what is understood by image-restitution means 19. Such an image-restitution means 19 can have the form in particular of a visual display screen, of a television screen, of a flat screen, of a projector, of virtual reality goggles, of a printer.

Such an image-restitution means 19 is composed of:
an electronic unit,
one or more sources of light, of electrons or of ink,
one or more modulators: devices for modulation of light, of electrons or of ink,
a focusing device, having in particular the form of an optical system in the case of a light projector or the form of electron-beam focusing coils in the case of a CRT screen, or the form of filters in the case of a flat screen,
a restitution medium 190 having in particular the form of a screen in the case of a CRT screen, of a flat screen or of a projector, the form of a print medium on which printing is performed in the case of a printer, or the form of a virtual surface in space in the case of a virtual-image projector.

By means of the said image-restitution means 19, it is possible to obtain, from an image 103, a restituted image 191 on restitution medium 190.

Animated images are composed of a succession of fixed images in time.

Image restitution is defined as the method by which the image is displayed or printed by means of image restitution means 19.

In the case in which a restitution means 19 is equipped with a plurality of interchangeable subassemblies or of subassemblies that can be shifted relative to one another, especially restitution medium 190, image-restitution means 19 is defined as a special configuration.

Sensor Surface, Optical Center, Focal Distance

Referring to FIG. 1, a description will now be given of what is defined as sensor surface 110.

Sensor surface 110 is defined as the shape in space drawn by the sensitive surface of sensor 101 of image-capture appliance 1 at the moment of image capture. This surface is generally plane.

An optical center 111 is defined as a point in space associated with image 103 at the moment of image capture. A focal distance is defined as the distance between this point ill and plane 110, in the case in which sensor surface 110 is plane.

Pixel, Pixel Value, Exposure Time

Referring to FIG. 3, a description will now be given of what is understood by pixel 104 and pixel value.

A pixel 104 is defined as an elemental zone of sensor surface 110 obtained by creating a grid, generally regular, of the said sensor surface 110. Pixel value is defined as a number associated with this pixel 104.

Image capture is, defined as determining the value of each pixel 104. The set of these values constitutes image 103.

During image, capture, the pixel value is obtained by integration, over the surface of pixel 104, during a time period defined as exposure time, of part of the light flux derived from scene 3 via optical system 100, and by converting the result of this integration to a digital value. The integration of the light flux and/or the conversion of the result of this integration to a digital value are performed by means of electronic unit 102.

This definition of the concept of pixel value is applicable to the case of black-and-white or color images 103, whether they be fixed or animated.

Depending on the cases, however, the part in question of the light flux is obtained in various ways:

a) In the case of, a color image 103, sensor surface 110 is generally composed of a plurality of types of pixels 104, associated respectively with light fluxes of different wavelengths, examples being red, green and blue pixels.

b) In the case of a color image 103, there may also be a plurality of sensors 101 disposed side-by-side, each receiving part of the light flux.

c) In the case of a color image 103, the colors used may be different from red, green and blue, such as for North American NTSC television, and they may exceed three in number.

d) Finally, in the case of an interlaced television scanning camera, the animated images produced are composed of an alternation of images 103 containing even-numbered lines and of images 103 containing odd-numbered lines.

Configuration Used, Adjustments Used, Characteristics Used

The configuration used is defined as the list of removable subassemblies of image-capture appliance 1, such as optical system 100 which, if it is interchangeable, is mounted on image-capture appliance 1. The configuration used is characterized in particular by:

the type of optical system 100,
the serial number of optical system 100 or any other designation.

Adjustments used are defined as:
the configuration used as defined hereinabove, as well as
the value of the manual or automatic adjustments available in the configuration used and having an impact on the content of image 103. These adjustments may be made by the user, especially by means of pushbuttons, or may be calculated by image-capture appliance 1. These adjustments may be stored in the appliance, especially on a removable medium, or on any device connected to the appliance. These adjustments may include in particular the adjustments of focusing, diaphragm and focal length of optical system 100, the adjustments of exposure time, the adjustments of white balance, and the integrated image-processing adjustments, such as digital zoom, compression and contrast.

Characteristics 74 used or set of characteristics 74 used are defined as:

a) Parameters related to the intrinsic technical characteristics of image-capture appliance 1, determined during the phase of design of image-capture appliance 1. For example, these parameters may include the formula of optical system 100 of the configuration used, which impacts the geometric defects and the sharpness of the captured images; the formula of optical system 100 of the configuration used includes in particular the shape, the arrangement and the material of the lenses of optical system 100.

These parameters may additionally include:
the geometry of sensor 101, or in other words sensor surface 110 as well as the shape and relative arrangement of pixels 104 on this surface,
the noise generated by electronic unit 102,
the equation for conversion of light flux to pixel value.

b) Parameters associated with the intrinsic technical characteristics of image-capture appliance 1, determined during the phase of manufacture of image-capture appliance 1 and, in particular:
the exact positioning of the lenses in optical system 100 of the configuration used,
the exact positioning of optical system 100 relative to sensor 101.

c) Parameters associated with the technical characteristics of image-capture appliance 1, determined at the moment of capture of image 103 and, in particular:
the position and orientation of sensor surface 110 relative to scene 3,
the adjustments used,
the external factors, such as temperature, if they have an influence.

d) The user's preferences, especially the color temperature to be used for image restitution. For example, these preferences are selected by the user by means of pushbuttons.

Observation Point, Observation Direction

Referring to FIG. 1, a description will now be given of what is understood by observation point 105 and observation direction 106.

Mathematical surface 10 is defined as a surface that is geometrically associated with sensor surface 110. For example, if the sensor surface is plane, it will be possible for mathematical surface 10 to coincide with the sensor surface.

Observation direction 106 is defined as a line passing through at least one point of scene 3 and through optical center 111. Observation point 105 is defined as the intersection of observation direction 106 and surface 10.

Observed Color, Observed Intensity

Referring to FIG. 1, a description will now be given of what is understood by observed color and observed intensity. Observed color is defined as the color of the light emitted, transmitted or reflected by the said scene 3 in the said observation direction 106 at a given instant, and observed from the said observation point 105. Observed intensity is defined as the intensity of the light emitted by the said scene 3 in the said observation direction 106 at the same instant, and observed from the said observation point 105.

The color can be characterized in particular by a light intensity that is a function of wavelength, or else by two values as measured by a calorimeter. The intensity can be characterized by a value such as measured with a photometer.

The said observed color and the said observed intensity depend in particular on the relative position of objects 107 in scene 3 and on the illumination sources present as well as on the transparency and reflection characteristics of objects 107 at the moment of observation.

Mathematical Projection, Mathematical Image, Mathematical Point, Mathematical Color of a Point, Mathematical Intensity of a Point, Mathematical Shape of a Point Mathematical Position of a Point Referring in particular to FIGS. 1, 5, 9*a*, 9*b*, 9*c* and 9*d*, a description will be given of the concepts of mathematical projection 8, mathematical image 70, mathematical point, mathematical color of a point, mathematical intensity of a point, mathematical shape 41 of a point, and mathematical position 40 of a point.

Referring to FIG. 5, a description will now be given of how a mathematical image 70 is constructed by specified mathematical projection 8 of at least one scene 3 on mathematical surface 10.

Firstly, a description will be given of what is understood by specified mathematical projection 8.

A specified mathematical projection 8 associates a mathematical image 70 with:
a scene 3 at the moment of capture of an image 103,
and with the characteristics 74 used.

A specified mathematical projection 81 is a transformation with which the characteristics of each point of mathematical image 70 can be determined from scene 3 at the moment of image capture and from the characteristics 74 used.

Mathematical projection 8 is preferentially defined in the manner to be described hereinafter.

Mathematical position 40 of the point is defined as the position of observation point 105 on mathematical surface 10.

Mathematical shape 41 of the point is defined as the geometric, punctiform shape of observation point 105.

Mathematical color of the point is defined as the observed color.

Mathematical intensity of the point is defined as the observed intensity.

Mathematical point is defined as the association of mathematical position 40, mathematical shape 41, mathematical color and mathematical intensity for the observation point 105 under consideration. Mathematical image 70 is composed of the set of said mathematical points.

The mathematical projection 8 of scene 3 is mathematical image 70.

Real Projection, Real Point, Real Color of a Point, Real Intensity of a Point, Real Shape of a Point, Real Position of a Point Referring in particular to FIGS. 3, 5, 9*a*, 9*b*, 9*c* and 9*d*, a description will be given hereinafter of the concepts of real projection 72, real point, real color of a point, real intensity of a point, real shape 51 of a point, and real position 50 of a point.

During image capture, image-capture appliance 1 associates an image 103 of scene 3 with the characteristics 74 used. The light originating from scene 3 in an observation direction 106 passes through optical system 100 and arrives at sensor surface 110.

For the said observation direction, there is then obtained what is defined as a real point, which exhibits differences compared with the mathematical point.

Referring to FIGS. 9*a* to 9*d*, a description will now be given of the differences between the real point and the mathematical point.

The real shape 51 associated with the said observation direction 106 is not a point on the sensor surface, but it has the form of a cloud in three-dimensional space, where it has an intersection with one or more pixels 104. These differences are due in particular to coma, spherical aberration, astigmatism, grouping into pixels 104, chromatic aberration, depth of field, diffraction, parasitic reflections and field curvature of image-capture appliance 1. They give an impression of blurring, or of lack of sharpness of image 103.

In addition, real position 50 associated with the said observation direction 106 exhibits a difference compared with mathematical position 40 of a point. This difference is due in particular to the geometric distortion, which gives an impression of deformation: for example, vertical walls appear to be curved. It is also due to the fact that the number of pixels 104 is limited, and that consequently the real position 50 can have only a finite number of values.

In addition, the real intensity associated with the said observation direction 106 exhibits differences compared with the mathematical intensity of a point. These differences are due in particular to gamma and vignetting: for example, the edges of image 103 appear to be darker. Furthermore, noise may be added to the signal.

Finally, the real color associated with the said observation direction 106 exhibits differences compared with the mathematical color of a point. These differences are due in particular to gamma and the color cast. Furthermore, noise may be added to the signal.

A real point is defined as the association of the real position 50, the real shape 51, the real color and the real intensity for the observation direction 106 under consideration.

The real projection 72 of scene 3 is composed of the set of real points.

Parameterizable transformation model, parameters, corrected image

A parameterizable transformation model 12 (or parameterizable transformation 12 for short) is defined as a mathematical transformation in which a corrected image 71 can be obtained from an image 103 and from the value of parameters. As indicated hereinbelow, the said parameters can in particular be calculated from the characteristics 74 used.

By means of the said parameterizable transformation 12, it is possible in particular to determine, for each real point of image 103, the corrected position of the said real point, the corrected color of the said real point, the corrected intensity of the said real point, and the corrected shape of the said real point, from the value of the parameters, from the real position of the said real point and from the values of the pixels of image 103. As an example, the corrected position can be calculated by means of polynomials of fixed degree as a function of the real position, the coefficients of the polynomials depending on the value of the parameters. The corrected color and the corrected intensity can be, for example, weighted sums of the values of the pixels, the coefficients depending on the value of the parameters and on the real position, or else can be nonlinear functions of the values of the pixels of image 103.

A parameterizable reverse transformation model 212 (or parameterizable reverse transformation 212 for short) is defined as a mathematical transformation in which an image 103 can be obtained from a corrected image 71 and from the value of parameters. The said parameters can be calculated in particular from the characteristics 74 used as indicated hereinbelow.

By means of the said parameterizable reverse transformation 212, it is possible in particular to determine, for each point of the corrected image 71, the real point of image 103 corresponding to the said point of corrected image 71, and in particular the position of the said real point, the color of the said real point, the intensity of the said real point, and the shape of the said real point, from the value of the parameters and from corrected image 71. As an example, the position of the real point can be calculated by means of polynomials of fixed degree as a function of the position of the point of the corrected image 71, the coefficients of the polynomials depending on the value of the parameters.

The parameters can include in particular: the focal length of optical system 100 of the configuration used, or a related value such as the position of a group of lenses, the focusing of optical system 100 of the configuration used, or a related value such as the position of a group of lenses, the aperture of optical system 100 of the configuration used, or a related value such as the position of the diaphragm.

Difference Between the Mathematical Image and the Corrected Image

Referring to FIG. 5, the difference 73 between mathematical image 70 and corrected image 71 for a given scene 3 and given characteristics 74 used is defined as one or more values determined from numbers characterizing the position, color, intensity, and shape of all or part of the corrected points and of all or part of the mathematical points.

For example, the difference 73 between mathematical image 70 and corrected image 71 for a given scene 3 and given characteristics 74 used can be determined as follows:

There are chosen characteristic points which, for example, may be the points of an orthogonal array 80 of regularly disposed points, as illustrated in FIG. 10.

The difference 73 is calculated, for example, by taking, for each characteristic point, the sum of the absolute values of the differences between each number characterizing the corrected position, the corrected color, the corrected intensity and the corrected shape respectively for the real point and for the mathematical point. The sum function of the absolute values of the differences may be replaced by another function such as the mean, the sum of the squares or any other function with which the numbers can be combined.

Reference Scene

A reference scene 9 is defined as a scene 3 for which certain characteristics are known. As an example, FIG. 4a shows a reference scene 9 composed of a paper sheet bearing regularly disposed, solid black circles. FIG. 4b shows another paper sheet bearing the same circles, with the addition of colored lines and areas. The circles are used to measure the real position 50 of a point, the lines to measure the real shape 51 of a point, and the colored areas to measure the real color of a point and the real intensity of a point. This reference scene 9 may be composed of a material other than paper.

Reference Image

Referring to FIG. 12, a definition will now be given of the concept of reference image 11. A reference image 11 is defined as an image of reference scene 9 obtained with image-capture appliance 1.

Synthetic Image, Synthetic-image Class

Referring to FIG. 12, a definition will now be given of the concept of synthetic image 207 and of synthetic-image class 7. A synthetic image 207 is defined as a mathematical image 70 obtained by mathematical projection 8 of a reference scene 9. A synthetic-image class 7 is defined as a set of mathematical images 70 obtained by mathematical projection 8 of one or more reference scenes 9 for one or more sets of characteristics 74 used. In the case in which there is only one reference scene 9 and only one set of characteristics 74 used, the synthetic-image class 7 comprises only one synthetic image 207.

Transformed Image

Referring to FIG. 12, a definition will now be given of the concept of transformed image 13. A transformed image 13 is defined as the corrected image obtained by application of a parameterizable transformation model 12 to a reference image 11.

Transformed Image Close to a Synthetic-image Class, Deviation

Referring to FIG. 12, a description will now be given of the concept of transformed image 13 close to a synthetic-image class 7 and of the concept of deviation 14.

The difference between a transformed image 13 and a synthetic-image class 7 is defined as the smallest difference between the said transformed image 13 and any one of the synthetic images 207 of the said synthetic-image class 7.

Referring to FIG. 12, a description will next be given of a fourth algorithm with which it is possible to choose, among the parameterizable transformation models 12, that with which each reference image 11 can be transformed to a transformed image 13 close to the synthetic-image class 7 of the reference scene 9 corresponding to the said reference image 11, in different cases of reference scenes 9 and characteristics 74 used.

In the case of a given reference scene 9 associated with a set of given characteristics 74 used, there is chosen the parameterizable transformation 12 (and its parameters) with which the reference image 11 can be transformed to the transformed image 13 that exhibits the smallest difference compared with synthetic-image class 7. Synthetic-image class 7 and transformed image 13 are then said to be close. Deviation 14 is defined as the said difference.

In the case of a group of given reference scenes associated with sets of given characteristics 74 used, the parameterizable transformation 12 (and its parameters) is chosen as a function of the differences between the transformed image 13 of each reference scene 9 and the synthetic-image class 7 of each reference scene 9 under consideration. There is chosen the parameterizable transformation 12 (and its parameters) with which the reference images 11 can be transformed to transformed images 13 such that the sum of the said differences is minimized. The, sum function may be replaced by another function such as the product. Synthetic-image class 7 and transformed images 13 are then said to be close. Deviation 14 is defined as a value obtained from the said differences, for example by calculating the mean thereof.

In the case in which certain characteristics 74 used are unknown, it is possible to determine them from the capture of a plurality of reference images 11 of at least one reference scene 9. In this case, there are simultaneously determined the unknown characteristics and the parameterizable transformation 12 (and its parameters) with which the reference images 11 can be transformed to transformed images 13, such that the sum of the said differences is minimized, in particular by iterative calculation or by solving equations concerning the sum of the said differences and/or their product and/or any other appropriate combination of the said differences. Synthetic-image class 7 and transformed images 13 are then said to be close. The unknown characteristics may be, for example, the relative positions and orientations of sensor surface 110 and of each reference scene 9 under consideration. Deviation 14 is defined as a value obtained from the said differences, for example by calculating the mean thereof.

Referring to FIG. 12, a description will next be given of a first calculation algorithm with which a choice can be made:
within a set of parameterizable transformation models,
within a set of parameterizable reverse transformation models,
within a set of synthetic images,
within a set of reference scenes and within a set of transformed images.

This choice is based on:
a reference scene 9, and/or
a transformed image 13, and/or
a parameterizable transformation model 12 with which the reference image 11 obtained by capturing reference scene 9 by means of image-capture appliance 1 can be transformed to transformed image 13, and/or.
a parameterizable reverse transformation model 212 with which transformed image 13 can be transformed to reference image 11, and/or
a synthetic image 207 obtained from reference scene 9 and/or obtained from reference image 11.

The choice adopted is that which minimizes the difference between transformed image 13 and synthetic image 207. Synthetic image 207 and transformed image 13 are then said to be close. Deviation 14 is defined as the said difference.

Preferably, according to the invention, it is possible by means of the first calculation algorithm to choose, within a set of mathematical projections, one mathematical projection 8 with which synthetic image 207 can be constructed from reference scene 9.

Referring to FIG. 12, a description will next be given of a second calculation algorithm that includes the stages of:
choosing at least one reference scene 9,
capturing at least one reference image 11 of each reference scene 9 by means of image-capture appliance 1.

This second algorithm additionally includes the stage of choosing, within a set of parameterizable transformation models and within a set of synthetic images:
a parameterizable transformation model 12 with which reference image 11 can be transformed to a transformed image 13, and/or
a synthetic image 207 obtained from reference scene 9 and/or obtained from reference image 11, The choice adopted is that which minimizes the difference between transformed image 13 and synthetic image 207. Synthetic image 207 and transformed image 13 are then said to be close. Deviation 14 is defined as the said difference.

Preferably, according to the invention, it is possible by means of the second calculation algorithm to choose, within a set of mathematical projections, one mathematical projection 8 with which synthetic image 207 can be constructed from reference scene 9.

Best Transformation

The best transformation is defined as:
the transformation with which, among the parameterizable transformation models 12, each reference image 11 can be transformed to a transformed image 13 close to synthetic-image class 7 of the reference scene 9 corresponding to the said reference image 11, and/or,
the parameterizable transformation models 12 among which the parameterizable transformation models, such as the transformed image 13, are close to synthetic image 207, and/or
the parameterizable reverse transformation models 212 among which the parameterizable reverse models, such as the transformed image 13, are close to the synthetic image 207.

Calibration

Calibration is defined as a method with which data related to the intrinsic characteristics of image-capture appliance 1 can be obtained, for one or more configurations used, each composed of an optical system 100 associated with an image-capture appliance 1.

Case 1: in the case in which there is only one configuration, the said method includes the following stages:
the stage of mounting the said optical system 100 on the said mage-capture appliance 1,
the stage of choosing one or more reference scenes 9,
the stage of choosing several characteristics 74 used,
the stage of capturing images of the said reference scenes 9 for the said characteristics used,
the stage of calculating the best transformation for each group of reference scenes 9 corresponding to the same characteristics 74 used.

Case 2: in the case in which all the configurations corresponding to a given image-capture appliance, 1 and to all optical systems 100 of the same type are taken into consideration, the said method includes the following stages:
the stage of choosing one or more reference scenes 9,
the stage of choosing several characteristics 74 used,
the stage of calculating images 103 from characteristics 74 used and in particular from formulas for optical system 100 of the configuration used and from values of parameters, by means, for example, of software for calculating the optical system by ray tracing,
the stage of calculating the best transformation for each group of reference scenes 9 corresponding to the same characteristics used.

Case 3: in the case in which all the configurations corresponding to a given optical system 100 and to all the image-capture appliances 1 of the same type are taken into consideration, the said method includes the following stages:
the stage of mounting the said optical system 100 on an image-capture appliance 1 of the type under consideration,
the stage of choosing one or more reference scenes 9,
the stage of choosing several characteristics 74 used,
the stage of capturing images of the said reference scenes 9 for the said characteristics used, the stage of calculating the best transformation for each group of reference scenes 9 corresponding to the same characteristics used.

Calibration can be performed preferentially by the manufacturer of image-capture appliance 1, for each appliance and configuration in case 1. This method is more precise but imposes more limitations and is highly suitable in the case in which optical system 100 is not interchangeable.

Alternatively, calibration can be performed by the manufacturer of image-capture appliance 1, for each appliance type and configuration in case 2. This method is less precise but is simpler.

Alternatively, calibration can be performed by the manufacturer of image-capture appliance 1 or by a third party, for each optical system 100 and type of appliance in case 3. This method is a compromise in which one optical system 100 can be used on all image-capture appliances 1 of one type, without repeating the calibration for each combination of image-capture appliance 1 and optical system 100. In the case in which an image-capture appliance has a non-interchangeable optical system, the method permits the calibration to be performed only one time for a given type of appliance.

Alternatively, calibration can be performed by the appliance seller or installer, for each image-capture appliance 1 and configuration in case 1.

Alternatively, calibration can be performed by the appliance seller or installer, for each optical system 100 and type of appliance in case 3.

Alternatively, calibration can be performed by the appliance user, for each appliance and configuration in case 1.

Alternatively calibration can be performed by the appliance user, for each optical system 100 and type of appliance in case 3.

Design of the Digital Optical System

Design of the digital optical system is defined as a method for reducing the cost of optical system 100, by:
designing an optical system 100 having defects, especially in positioning of real points, or choosing the same from a catalog,
reducing the number of lenses, and/or
simplifying the shape of the lenses, and/or
using less expensive materials, processing operations or manufacturing processes.

The said method includes the following stages:
the stage of choosing an acceptable difference (within the meaning defined hereinabove),
the stage of choosing one or more reference scenes 9,
the stage of choosing several characteristics 74 used.

The said method also includes iteration of the following stages:
the stage of choosing an optical formula that includes in particular the shape, material and arrangement of the lenses,
the stage of calculating images 103 from the characteristics 74 used and in particular from the formulas for optical system 100 of the configuration used, by employing, for example, software for calculating the optical system by ray tracing, or by making measurements on a prototype,
the stage of calculating the best transformation for each group of reference scenes 9 corresponding to the same characteristics 74 used,
the stage of verifying if the difference is acceptable, until the difference is acceptable.

Formatted Information

Formatted information 15 associated with image 103, or formatted information 15, is defined as all or part of the following data:
data related to the intrinsic technical characteristics of image-capture appliance 1, especially the distortion characteristics, and/or
data related to the technical characteristics of image-capture appliance 1 at the moment of image capture, especially the exposure time, and/or
data related to the preferences of the said user, especially the color temperature, and/or
data related to the deviations 14.

Database of Characteristics

A database 22 of characteristics is defined as a database containing formatted information 15 for one or more image-capture appliances 1 and for one or more images 103.

The said database 22 of characteristics can be stored in centralized or distributed manner, and in particular can be:
integrated into image-capture appliance 1,
integrated into optical system 100,
integrated into a removable storage device,
integrated into a PC or other computer connected to the other elements during image capture,
integrated into a PC or other computer connected to the other elements after image capture,
integrated into a PC or other computer capable of reading a storage medium shared with image-capture appliance 1,
integrated into a remote server connected to a PC or other computer, itself connected to the other image-capture elements.

Fields

Referring to FIG. 8, a definition will now be given of the concept of fields 91. The formatted information 15 associated with image 103 can be recorded in several forms and structured into one or more tables, but it corresponds logically to all or part of fields 91, comprising:
(a) the focal distance,
(b) the depth of field
(c) the geometric defects.

The said geometric defects include geometric defects of image 103 characterized by the parameters associated with the filming characteristics 74 and a parameterizable transformation representing the characteristics of image-capture appliance 1 at the moment of filming. By means of the said parameters and of the said parameterizable transformation, it is possible to calculate the corrected position of a point of image 103.

The said geometric defects also include the vignetting characterized by the parameters associated with filming characteristics 74 and a parameterizable transformation representing the characteristics of image-capture appliance 1 at the moment of filming. By means of the said parameters and the said parameterizable transformation, it is possible to calculate the corrected intensity of a point of image 103.

The said geometric defects also include the color cast characterized by the parameters associated with filming characteristics 74 and a parameterizable transformation representing the characteristics of image-capture appliance 1 at the moment of filming. By means of the said parameters and the said parameterizable transformation, it is possible to calculate the corrected color of a point of image 103.

The said fields 91 also include (d) the sharpness of image 103.

The said sharpness includes the blurring in resolution of image 103 characterized by the parameters associated with filming characteristics 74 and a parameterizable transformation representing the characteristics of image-capture appliance 1 at the moment of filming. By means of the said parameters and the said parameterizable transformation, it is possible to calculate the corrected shape of a point of image 103. Blurring covers in particular coma, spherical aberration, astigmatism, grouping into pixels 104, chromatic aberration, depth of field, diffraction, parasitic reflections and field curvature.

The said sharpness also includes the blurring in depth of field, in particular spherical aberrations, coma and astigmatism. The said blurring depends on the distance of the points of scene 3 relative to image-capture appliance 1, and it is characterized by the parameters associated with filming characteristics 74 and a parameterizable transformation representing the characteristics of image-capture appliance 1 at the moment of filming. By means of the said parameters and of the said parameterizable transformation, it is possible to calculate the corrected shape of a point of image 103.

The said fields 91 also include (e) parameters of the quantization method. The said parameters depend on the geometry and physics of sensor 101, on the architecture of electronic unit 102 and on any processing software that may be used.

The said parameters include a function that represents the variations of intensity of a pixel 104 as a function of wavelength and light flux derived from the said scene 3. The said function includes in particular gamma information.

The said parameters also include:
  the geometry of the said sensor 101, especially the shape, the relative position and the number of sensitive elements of the said sensor 101,
  a function representative of the spatial and temporal distribution of noise of image-capture appliance 1,
  a value representative of the exposure time for image capture.

The said fields 91 also include (f) parameters of the digital-processing operations performed by image-capture appliance 1, especially digital zoom and compression. These parameters depend on the processing software of image-capture appliance 1 and on the user's adjustments.

The said fields 91 also include:
  (g) parameters representative of the user's preferences, especially as regards the degree of blurring and the resolution of image 103.
  (h) the deviations 14.

Calculation of Formatted Information

The formatted information 15 can be calculated and recorded in database 22 in several stages.

a) A stage at the end of design of image-capture appliance 1.

By means of this stage it is possible to obtain intrinsic technical characteristics of image-capture appliance 1, and in particular:
  the spatial and temporal distribution of the noise generated by electronic unit 102,
  the formula for conversion of light flux to pixel value,
  the geometry of sensor 101.

b) A stage at the end of calibration or design of the digital optical system.

By means of this stage it is possible to obtain other intrinsic technical characteristics of image-capture appliance 1, and in particular, for a certain number of values of characteristics used, the best associated transformation and the associated deviation 14.

c) A stage in which the user's preferences are chosen by means of pushbuttons, menus or removable media, or of connection to another device.

d) An image capture stage.

By means of this stage (d) it is possible to obtain technical characteristics of image-capture appliance 1 at the moment of image capture, and in particular the exposure time, which is determined by the manual or automatic adjustments made.

By means of stage (d) it is also possible to obtain the focal distance. The focal distance is calculated from:
  a measurement of the position of the group of lenses of variable focal length of optical system 100 of the configuration used, or
  a set value input to the positioning motor, or
  a manufacturer's value if the focal length is fixed.
The said focal distance can then be determined by analysis of the content of image 103.

By means of stage (d) it is also possible to obtain the depth of field. The depth of field is calculated from:
  a measurement of the position of the group of focusing lenses of optical system 100 of the configuration used, or
  a set value input to the positioning motor, or
  a manufacturer's value if the depth of field is fixed.

By means of stage (d) it is also possible to obtain the defects of geometry and of sharpness. The defects of geometry and of sharpness correspond to a transformation calculated by means of a combination of transformations of the database 22 of characteristics obtained at the end of stage (b). This combination is chosen to represent the values of parameters corresponding to the characteristics 74 used, especially the focal distance.

By means of stage (d) it is also possible to obtain the parameters of digital processing performed by image-capture appliance 1. These parameters are determined by the manual or automatic adjustments made The calculation of formatted information 15 according to stages (a) to (d) can be performed by:
  a device or software integrated into image-capture appliance 1, and/or
  driver software in a PC or other computer, and/or
  software in a PC or other computer, and/or
  a combination of the three.

The foregoing transformations in stage (b) and stage (d) can be stored in the form of:
  a general mathematical formula,
  a mathematical formula for each point,
  a mathematical formula for certain characteristic points.
The mathematical formulas can be described by:
  a list of coefficients,
  a list of coefficients and coordinates.

By means of these different methods it is possible to reach a compromise between the size of the memory available for storage of the formulas and the calculating power available for calculation of the corrected images 71.

In addition, in order to retrieve the data, identifiers associated with the data are recorded in database 22. These identifiers include in particular:
  an identifier of the type and of the reference of image-capture appliance 1, an identifier of the type and of the reference of optical system 100, if it is removable, an identifier of the type and of the reference of any other removable element having a link to the stored information, an identifier of image 103, an identifier of the formatted information 15.

Completed Image

As described by FIG. 11, a completed image 120 is defined as the image 103 associated with the formatted information 15. This completed image 120 can preferentially have the form of a file P100, as described by FIG. 14. Completed image 120 can also be distributed into a plurality of files.

Completed image 120 can be calculated by image-capture appliance 1. It can also be calculated by an external calculating device, such as a computer.

Image-processing Software

Image-processing software 4 is defined as software that accepts one or more completed images 120 as input and that performs processing operations on these images. These processing operations can include in particular:

calculating a corrected image 71, performing measurements in the real world, combining several images, improving the fidelity of the images relative to the real world, improving the subjective quality of images, detecting objects or persons 107 in a scene 3, adding objects or persons 107 to a scene 3, replacing or modifying objects or persons 107 in a scene 3, removing shadows from a scene 3, adding shadows to a scene 3, searching for objects in an image base.

The said image-processing software can be:

integrated into image-capture appliance 1, run on calculating means 17 connected to image-capture appliance 1 by transmission means 18.

Digital Optical System

A digital optical system is defined as the combination of an image-capture appliance 1, a database 22 of characteristics and a calculating means 17 that permits:

image capture of an image 103, calculation of the completed image, calculation of the corrected image 71.

Preferentially, the user obtains corrected image 71 directly. If he wishes, the user may demand suppression of automatic correction.

The database 22 of characteristics may be:

integrated into image-capture appliance 1, integrated into a PC or other computer connected to the other elements during image capture, integrated into a PC or other computer connected to the other elements after image capture;

integrated into a PC or other computer capable of reading a storage medium shared with image-capture appliance 1, integrated into a remote server connected to a PC or other computer, itself connected to the other image-capture elements.

Calculating means 17 may be:

integrated onto a component together with sensor 101, integrated onto a component together with part of electronics unit 102, integrated into image capture appliance 1, integrated into a PC or other computer connected to the other elements during image capture, integrated into a PC or other computer connected to the other elements after image capture, integrated into a PC or other computer capable of reading a storage medium shared with image-capture appliance 1, integrated into a remote server connected to a PC or other computer, itself connected to the other image-capture elements.

Processing of the Complete Chain

The foregoing paragraphs have essentially presented precise details of the concepts and description of the method and system according to the invention for providing, to image-processing software 4, formatted information 15 related to the characteristics of image-capture appliance 1.

In the paragraphs to follow, an expanded definition will be given of the concepts and a supplemented description will be given of the method and system according to the invention for providing, to image-processing software 4, formatted information 15 related to the characteristics of image-restitution means 19. In this way the processing of a complete chain will be explained.

By means of the processing of the complete chain, it Is possible:

to improve the quality of image 103 from one end of the chain to the other, to obtain a restituted image 191 while correcting the defects of image-capture appliance 1 and of image-restitution means 19, and/or to use optical systems of lower quality and of lower cost in a video projector in combination with software for improvement of image quality.

Definitions Associated with the Image-restitution Means

On the basis of FIGS. 2, 17 and 6, a description will now be given of how the characteristics of an image-restitution means 19 such as a printer, a visual display screen or a projector are taken into account in the formatted information 15.

The supplements or modifications to be made to the definitions in the case of an image-restitution means 19 may be inferred by analogy by a person skilled in the art by analogy with the definitions provided in the case of an image-capture appliance 1. Nevertheless, in order to illustrate this method, a description with reference in particular to FIG. 6 and FIG. 17 will now be given of the main supplements or modifications.

By restitution characteristics 95 used there are designated the intrinsic characteristics of image-restitution means 19, the characteristics of image-restitution means 19 at the moment of image restitution, and the user's preferences at the moment of image restitution. In the case of a projector in particular, the restitution characteristics 95 used include the shape and position of the screen used.

By parameterizable restitution transformation model 97 (or parameterizable restitution transformation 97 for short), there is designated a mathematical transformation similar to parameterizable transformation model 12. By parameterizable reverse restitution transformation model 297 (or parameterizable reverse restitution transformation 297 for short), there is designated a mathematical transformation similar to parameterizable reverse transformation model 212.

By corrected restitution image 94 there is designated the image obtained by application of parameterizable restitution transformation 97 to image 103.

By mathematical restitution projection 96 there is designated a mathematical projection that associates, with a corrected restitution image 94, a mathematical restitution image 92 on the mathematical restitution surface geometrically associated with the surface of restitution medium 190. The mathematical restitution points of the mathematical restitution surface have a shape, position, color and intensity calculated from corrected restitution image 94.

By real restitution projection 90 there is designated a projection that associates a restituted image 191 with an image 103. The pixel values of image 103 are converted by the electronic unit of restitution means 19 to a signal that drives the modulator of restitution means 19. Real restitution points are obtained on restitution medium 190. The said real restitution points are characterized by shape, color, intensity and position. The phenomenon of grouping into-pixels 104 described hereinabove in the case of an image-capture appliance 1 does not occur in the case of an image-restitution means. On the other hand, an inverse phenomenon occurs, with the result in particular that lines take on a staircase appearance.

Restitution difference 93 is designated as the difference between restituted image 191 and mathematical restitution image 92. This restitution difference 93 is obtained by analogy with difference 73.

By restitution reference 209 there is designated an image 103 in which the values of pixels 104 are known. By restituted reference 211 there is designated the restituted image 191 obtained by mathematical restitution projection 90 of restitution reference 209. By corrected reference restitution image 213, there is designated the corrected restitution image 94 corresponding to restitution reference 209 for parameterizable restitution transformation model 97 and/or for parameterizable reverse restitution transformation model 297. By synthetic restitution image 307 there is designated the mathematical restitution image 92 obtained by mathematical restitution projection 96 of corrected reference restitution image 213.

By best restitution transformation there is designated:
for a restitution reference 209 and the restitution characteristics 95 used, that with which image 103 can be transformed to a corrected restitution image 94 such that its mathematical restitution projection 92 exhibits the minimum restitution difference 93 compared with restituted image 191, and/or
the parameterizable restitution transformation 97 among the parameterizable restitution transformation models such that restituted reference 211 exhibits the minimum restitution difference 93 compared with the synthetic restitution image 307, and/or
the parameterizable reverse restitution transformation 297 among the parameterizable reverse transformation models such that the restituted reference 211 exhibits the minimum restitution difference 93 compared with the synthetic restitution image 307.

The restituted reference 211 and the synthetic restitution image 307 are then said to be close.

The methods of restitution calibration and of design of the digital optical restitution system are comparable with the methods of calibration and of design of the digital optical system in the case of an image-capture appliance 1. Nevertheless, differences are present in certain stages, and in particular the following stages:
the stage of choosing a restitution reference 209;
the stage of performing restitution of the said restitution reference;
the stage of calculating the best restitution transformation.

Preferably, according to the invention, the method includes a sixth algorithm for calculation of the formatted information 15. By means of this sixth algorithm it is possible to make a choice:
within a set of parameterizable restitution transformation models,
within a set of parameterizable reverse restitution transformation models,
within a set of mathematical restitution projections,
within a set of restitution references and within a set of corrected reference restitution images.

The choice made by this sixth algorithm is based on:
a restitution reference 209, and/or
a corrected reference restitution image 213, and/or
a parameterizable restitution transformation model 97 with which the restitution reference 209 can be transformed to the corrected reference restitution image 213, and/or
a parameterizable reverse restitution transformation model 297 with which the corrected reference restitution image 213 can be transformed to the restitution reference 209, and/or
a mathematical restitution projection 96 with which a synthetic restitution image 307 can be constructed from the corrected reference restitution image 213.

The choice is made by this sixth algorithm in such a way that the synthetic restitution image 307 is close to the restituted reference 211 obtained by restitution of restitution reference 209 by means of image-restitution means 19. Restituted reference 211 exhibits a restitution deviation 214 compared with synthetic restitution image 307.

According to an alternative embodiment of the invention, the method includes a seventh algorithm for calculation of the formatted information. This seventh algorithm includes the stages of:
choosing at least one restitution reference 209,
restituting restitution reference 209 to a restituted reference 211 by means of image-restitution means 19.

By means of this seventh algorithm it is also possible to choose, within a set of parameterizable restitution transformation models and within a set of mathematical restitution projections:
a parameterizable restitution transformation model 97 with which restitution reference 209 can be transformed to a corrected reference restitution image 213, and
a mathematical restitution projection 96 with which a synthetic restitution image 307 can be constructed from corrected reference restitution image 213.

The choice is made by the seventh algorithm in such a way that synthetic restitution image 307 is close to restituted reference 211. The restituted reference exhibits a restitution deviation 214 compared with the synthetic restitution image 307. By means of parameterizable reverse restitution transformation model 297, it is possible to transform corrected reference restitution image 213 to restitution reference 209.

According to another alternative embodiment of the invention, the method includes an eighth algorithm for calculation of the formatted information. This eighth algorithm includes the stage of choosing a corrected reference restitution image 213. This eighth algorithm also includes the stage of making a choice within a set of parameterizable restitution transformation models, within a set of mathematical restitution projections and within a set of restitution references. This choice is based on:
- a restitution reference 209, and/or
- a parameterizable restitution transformation model 97 with which restitution reference 209 can be transformed to corrected reference restitution image 213, and/or
- a parameterizable reverse restitution transformation model 297 with which the corrected reference restitution image 213 can be transformed to the restitution reference 209, and/or
- a mathematical restitution projection 96 with which a synthetic restitution image 307 can be constructed from the corrected reference restitution image 213.

The eighth algorithm makes this choice in such a way that synthetic restitution image 307 is close to restituted reference 211 obtained by restitution of restitution reference 209, by means of image-restitution means 19. Restituted reference 211 exhibits a restitution deviation compared with synthetic restitution image 307.

Preferably, according to the invention, the method includes a ninth algorithm for calculating the restitution deviations 214. This ninth algorithm includes the stages of:
- calculating the restitution deviations 214 between restituted reference 211 and synthetic restitution image 307,
- associating restitution deviations 214 with formatted information 15.

It results from the combination of technical features that it is possible to verify automatically, for example during manufacture of the appliance, that the method has produced formatted information within acceptable tolerances.

The formatted information 15 related to an image-capture appliance 1 and that related to an image-restitution means 19 can be used end-to-end for the same image.

It is also possible to combine the formatted information 15 related to each of the appliances to obtain formatted information 15 related to the appliance chain, for example by addition of a vector field, in the case of geometric distortion.

In the foregoing, a description was given of the concept of field in the case of an image-capture appliance 1. This concept is also applicable by analogy in the case of image-restitution means 19. Nonetheless the parameters of the quantization method are replaced by the parameters of the signal-reconstitution method, meaning: the geometry of restitution medium 190 and its position, a function representing the spatial and temporal distribution of the noise of image-restitution means 19.

In an alternative embodiment according to the invention, restitution means 19 is associated with an image-capture appliance 1 to restitute, in digital form, restituted reference 211 from restitution reference 209. The method is such that, to produce the formatted information 15 related to the defects P5 of restitution means 19, the formatted information 15 related to image-capture appliance 1 associated with the restitution means is used, for example, to correct the defects of image-capture appliance 1 in such a way that restituted reference 211 contains only the defects P5 of restitution means 19.

Generalization of the Concepts

The technical features of which the invention is composed and which are specified in the claims have been defined, described and illustrated by referring essentially to image-capture appliances of digital type, or in other words appliances that produce digital images. It can be easily understood that the same technical features are applicable in the case of image-capture appliances that would be the combination of an appliance based on silver technology (a photographic or cinematographic appliance using sensitive silver halide films, negatives or reversal films) with a scanner for producing a digital image from the developed sensitive films. Certainly it is appropriate in this case to adapt at least some of the definitions used. Such adaptations are within the capability of the person skilled in the art. In order to demonstrate the obvious character of such adaptations, it is merely necessary to mention that the concepts of pixel and pixel value illustrated by referring to FIG. 3 must, in the case of the combination of an appliance based on silver technology with a scanner, be applied to an elemental zone of the surface of the film after this has been digitized by means of the scanner. Such transpositions of definitions are self-evident and can be extended to the concept of the configuration used. As an example, the list of removable subassemblies of image-capture appliance 1 included in the configuration used can be supplemented by the type of photographic film effectively used in the appliance based on silver technology.

Other characteristics and advantages of the invention will become clear upon reading the indicative and non-limitative definitions and examples explained hereinafter with reference to FIGS. 1 to 17.

Appliance

Referring in particular to FIGS. 2, 3 and 13, a description will be given of the concept of appliance P25. Within the meaning of the invention, an appliance P25 may be in particular:
- an image-capture appliance 1, such as a disposable photo appliance, a digital photo appliance, a reflex appliance, a scanner, a fax machine, an endoscope, a camcorder, a surveillance camera, a game, a camera integrated into or connected to a telephone, to a personal digital assistant or to a computer, a thermal camera or an echographic appliance,
- an image-restitution appliance 19 or image-restitution means 19, such as a screen, a projector, a television set, virtual-reality goggles or a printer,
- an appliance, including its installation, such as a projector, a screen and the manner in which they are positioned,
- the positioning of an observer relative to an image-restitution appliance 19, which introduces parallax errors in particular,
- a human being or observer having vision defects, such as astigmatism,
- an appliance which it is hoped can be emulated, to produce images having, for example, an appearance similar to those produced by an appliance of the Leica brand,
- an image-processing device, such as zoom software, which has the edge effect of adding blurring,
- a virtual appliance equivalent to a plurality of appliances P25, A more complex appliance P25, such as a scanner/fax/printer, a photo-printing Minilab, or a videoconferencing appliance can be regarded as an appliance P25 or as a plurality of appliances P25.

Appliance Chain

Referring in particular to FIG. 13, a description will now be given of the concept of appliance chain P3. An appliance chain P3 is defined as a set of appliances P25. The concept of appliance chain P3 may also include a concept of order.

The following examples constitute appliance chains P3:
a single appliance P25,
an image-capture appliance and an image-restitution appliance 19,
a photo appliance, a scanner or a printer, for example in a photo-printing Minilab,
a digital photo appliance or a printer, for example in a photo-printing. Minilab,
a scanner, a screen or a printer, for example in a computer,
a screen or projector, and the eye of a human being,
one appliance and another appliance which it is hoped can be emulated,
a photo appliance and a scanner,
an image-capture appliance and image-processing software,
image-processing software and an image-restitution appliance 19,
a combination of the preceding examples,
another set of appliances P25.

Defect

Referring in particular to FIG. 13, a description will now be given of the concept of defect P5. A defect P5 of appliance P25 is defined as a defect related to the characteristics of the optical system and/or of the sensor and/or of the electronic unit and/or of the software integrated in an appliance P25; examples of defects P5 include geometric defects, sharpness defects, colorimetry defects, geometric distortion defects, geometric chromatic aberration defects, geometric vignetting defects, contrast defects, colorimetry defects, in particular rendering of colors and color cast, defects of flash uniformity, sensor noise, grain, astigmatism defects and spherical aberration defects.

Image

Referring in particular to FIGS. 2, 5, 6 and 13, a description will now be given of the concept of image 103. Image 103 is defined as a digital image captured or modified or restituted by an appliance P25. Image 103 may originate from an appliance P25 of appliance chain P3. Image 103 may be addressed to an appliance P25 of appliance chain P3. More generally, image 103 may be derived from and/or addressed to appliance chain P3. In the case of animated images, such as video images, composed of a time sequence of fixed images, image 103 is defined as one fixed image of the sequence of images.

Formatted Information

Referring in particular to FIGS. 7, 8, 10 and 13, a description will now be given of the concept of formatted information 15. Formatted information 15 is defined as data related to the defects P5 or characterizing the defects P5 of one or more appliances P25 of appliance chain P3 and enabling image-processing means P1 to modify the quality of images 103 by making allowance for the defects P5 of appliance P25.

To produce the formatted information 15, there can be used various methods and systems based on measurements and/or simulations and/or calibrations, such as, for example, the calibration method described hereinabove.

To transmit the formatted information 15, there can be used a file P100 containing the completed image 120. As an example, an image-capture appliance 1 such as a digital photo appliance can produce files containing image 103, formatted information 15 copied from an internal memory of the appliance, and data in Exif format containing the adjustments used.

To produce the formatted information 15, it is possible, for example, to use the method and the system described in the International Patent Application filed on the same day as the present application in the name of Vision IQ and entitled "Method and system for producing formatted information related to geometric distortions". That application describes a method for producing formatted information 15 related to the appliances P25 of an appliance chain P3. Appliance chain P3 is composed in particular of at least one image-capture appliance and/or at least one image-restitution appliance. The method includes the stage of producing formatted information 15 related to the geometric distortions of at least one appliance P25 of the chain.

Appliance P25 preferably makes it possible to capture or restitute an image on a medium. Appliance P25 contains at least one fixed characteristic and/or one variable characteristic depending on the image. The fixed characteristic and/or variable characteristic can be associated with one or more values of characteristics, especially the focal length and/or the focusing and their values of associated characteristics. The method includes the stage of producing, from a measured field, measured formatted information related to the geometric distortions of the appliance. The formatted information 15 may include the measured formatted information.

To produce the formatted information 15, it is possible, for example, to use the method and the system described in the International Patent Application filed on the same day as the present application in the name of Vision IQ and entitled "Method and system for producing formatted information related to the defects of at least one appliance of a chain, especially to blurring". That application describes a method for producing formatted information 15 related to the appliances P25 of an appliance chain P3. Appliance chain P3 is composed in particular of at least one image-capture appliance and/or at least one image-restitution appliance. The method includes the stage of producing formatted information 15 related to the defects P5 of at least one appliance P25 of the chain. Preferably, appliance P25 with which an image can be captured or restituted contains at least one fixed characteristic and/or one variable characteristic depending on the image (I). The fixed and/or variable characteristics can be associated with one or more values of characteristics, especially the focal length and/or the focusing and their values of associated characteristics. The method includes the stage of producing measured formatted information related to the defects P5 of appliance P25 from a measured field. The formatted information 15 may include the measured formatted information.

To produce the formatted information 15, it is possible, for example, to use the method and the system described in the International Patent Application filed on the same day as the present application in the name of Vision IQ and entitled "Method and system for reducing update frequency of image processing means". That application describes a method for reducing the update frequency of image-processing means P1, in particular software and/or a component. The image-processing means make it possible to modify the quality of the digital images derived from or addressed to an appliance chain P3. Appliance chain P3 is composed in particular of at least one image-capture appliance and/or at least one image-restitution appliance. Image-processing means P1 employ formatted information 15 related to the defects P5 of at least one appliance of appliance chain P5. The formatted information 15 depends on at least one variable. The formatted information 15 makes it possible to establish a correspondence between one part of the variables and of the identifiers. By means of the identifiers it is possible to determine the value of the variable corresponding to the identifier by taking the identifier and the image into account. It results from the combination of technical features that it is possible to determine the value of a variable, especially in the case in which the physical significance and/or the content of the variable are known only after distribution of image-processing means P1. It also results from the combination of technical features that the time between two updates of the correction software can be spaced apart. It also results from the combination of technical features that the various economic players that produce appliances and/or image-processing means can update their products independently of other economic players, even if the latter radically change the characteristics of their product or are unable to force their client to update their products. It also results from the combination of technical features that a new functionality can be deployed progressively by starting with a limited number of economic players and pioneer users.

To search for the formatted information 15, it is possible, for example, to use the method and the system described in the International Patent Application filed on the same day as the present application in the name of Vision IQ and entitled "Method and system for modifying the quality of at least one image derived from or addressed to an appliance chain". That application describes a method for modifying the quality of at least one image 103 derived from or addressed to a specified appliance chain. The specified appliance chain is composed of at least one image-capture appliance and/or at least one image-restitution appliance. The image-capture appliances and/or the image-restitution appliances being progressively introduced on the market by separate economic players belong to an indeterminate set of appliances. The appliances P25 of the set of appliances exhibit defects P5 that can be characterized by formatted information 15. For the image in question, the method includes the following stages:

the stage of compiling directories of the sources of formatted information related to the appliances P25 of the set of appliances, the stage of automatically searching for specific formatted information related to the specified appliance chain among the formatted information 15 compiled in this way, the stage of automatically modifying the image by means of image-processing software and/or image-processing components, while taking into account the specific formatted information obtained in this way.

To exploit the formatted information 15, it is possible, for example, to use the method and the system described in the International Patent Application filed on the same day as the present application in the name of Vision IQ and entitled "Method and system for calculating a transformed image from a digital image and formatted information related to a geometric transformation". That application describes a method for calculating a transformed image from a digital image and formatted information 15 related to a geometric transformation, especially formatted information 15 related to the distortions and/or chromatic-aberrations of an appliance chain P3. The method includes the stage of calculating the transformed image from an approximation of the geometric transformation. It results therefrom that the calculation is economical in terms of memory resources, in memory bandpass, in calculating power and therefore in electricity consumption. It also results therefrom that the transformed image does not exhibit any visible or annoying defect as regards its subsequent use.

To exploit the formatted information 15, it is possible, for example, to use the method and the system described in the International Patent Application filed on the same day as the present application in the name of Vision IQ and entitled "Method and system for modifying a digital image, taking into account its noise". That application describes a method for calculating a transformed image from a digital image and formatted information 15 related to the defects P5 of an appliance chain P3. Appliance chain P3 includes image-capture appliances and/or image-restitution appliances. Appliance chain P3 contains at least one appliance P25. The method includes the stage of automatically determining the characteristic data from the formatted information 15 and/or the digital image. It results from the combination of technical features that the transformed image does not exhibit any visible or annoying defect, especially defects related to noise, as regards its subsequent use.

Image-processing Means

Referring in particular to FIGS. 7 and 13, a description will now be given of the concept of image-processing means P1. Within the meaning of the present invention, image-processing means P1 are defined, for example, as image-processing software 4 and/or a component and/or an equipment item and/or a system capable of modifying the quality of image 103 by employing formatted information 15 in order to produce a modified image, such as a corrected image 71 or a corrected restitution image 97. The modified image may be addressed to a second appliance of appliance chain P3, distinct or not from appliance P25, for example, the following appliance in appliance chain P3.

The modification of image quality by image-processing means P1 may consist, for example, in:

suppressing or attenuating the defects P5 of one or more appliances P25 of appliance chain P3 in image 103, and/or modifying image 103 to add at least one defect P5 of one or more appliances P25 of appliance chain P3 in such a way that the modified image resembles an image captured by appliance or appliances P25, and/or modifying image 103 to add at least one defect P5 of one or more appliances P25 of appliance chain P3 in such a way that the restitution of the modified image resembles an image restituted by appliance or appliances P25, and/or modifying image 103 by taking into account the formatted information 15 related to the vision defects P5 of the eye P25 of a human being in appliance chain P3 in such a way that restitution of the modified image is perceived by the eye of the human being as corrected for all or part of the defects P5.

A correction algorithm is defined as the method employed by an image-processing means P1 to modify image quality depending on the defect P5.

Image-processing means P1 may assume various forms depending on the application.

Image-processing means P1 may be integrated entirely or partly in appliance P25, as in the following examples:

an image-capture appliance that produces modified images, such as a digital photo appliance in which image-processing means P1 are integrated, an image-restitution appliance 19, which displays or prints modified images, such as a video projector in which image-processing means P1 are included, a hybrid appliance, which corrects the defects of its elements, such as a scanner/printer/fax machine in which image-processing means P1 are included, a professional image-capture appliance, which produces modified images, such as an endoscope in which image-processing means P1 are included.

In the case in which image-processing means P1 are integrated in appliance P25, appliance P25 in practice corrects its own defects P5, and the appliances P25 of appliance chain P3 can be determined by design, for example in a fax machine: a scanner and a printer; nevertheless, the user is able to use only part of the appliances P25 of appliance chain P3, for example if the fax machine can also be used as a stand-alone printer.

Image-processing means P1 can be integrated entirely or partly in a computer, for example in the following manner:

in an operating system, such as Windows or the Mac OS, in order to modify automatically the quality of images derived from or addressed to a plurality of appliances P25, which may vary depending on image 103 and/or in time, examples being scanners, photo appliances and printers; the automatic correction may be made, for example, when image 103 is input into the system, or when printing is requested by the user, in an image-processing application, such as Photoshop™, to modify automatically the quality of images derived from or addressed to a plurality of appliances P25, which may vary depending on image and/or in time, examples being scanners, photo appliances and printers; the automatic correction may be made, for example, when the user activates a filter command in Photoshop™, in a photo-printing appliance (such as Photofinishing or Minilab in English), to modify automatically the quality of images derived from a plurality of photo appliances, which may vary depending on the image and/or in time, examples being disposable cameras, digital photo appliances and compact disks, the automatic correction may take into account the photo appliances as well as the integrated scanner and printer, and may be applied at the moment at which the printing jobs are initiated;

on a server, for example on the Internet, to modify automatically the quality of images derived from a plurality of photo appliances, which may vary depending on the image and/or in time, examples being disposable cameras and digital photo appliances, the automatic correction may take into account the photo appliances as well as a printer, for example, and may be applied at the moment at which the images 103 are recorded on the server, or at the moment at which the printing jobs are initiated.

In the case in which image-processing means P1 are integrated in a computer, image-processing means P1 are for practical purposes compatible with multiple appliances P25, and at least one appliance P25 of appliance chain P3 may vary from one image 103 to another.

To provide formatted information 15 in a standard format to image-processing means P1, it is possible, for example, to associate the formatted information 15 with image 103:

in a file P100, by using identifiers of appliances P25 of appliance chain P3, such as data in Exif format in file P100, in order to retrieve formatted information 15 in database 22 of characteristics.

Variable Characteristic

On the basis of FIG. 13, a description will now be given of the concept of variable characteristic P6. According to the invention, a variable characteristic P6 is defined as a measurable factor, which is variable from one image 103 to another that has been captured, modified or restituted by the same appliance P25, and which has an influence on deflect P5 or the image that has been captured, modified or restituted by appliance P25, especially:

a global variable characteristic, which is fixed for a given image 103, an example being a characteristic of appliance P25 at the moment of capture or restitution of the image, related to an adjustment of the user or related to an automatic function of appliance P25, such as the focal length, a local variable characteristic, which is variable within a given image 103, an example being coordinates x, y or rho, theta in the image, permitting image-processing means P1 to apply local processing that differs depending on the zone of the image.

A measurable factor which is variable from one appliance P25 to another but which is fixed from one image 103 to another that has been captured, modified or restituted by the same appliance P25 is not generally considered to be a variable characteristic P6. An example is the focal length for an appliance P25 with fixed focal length.

The adjustments used as described hereinabove are examples of variable characteristics P6.

The formatted information 15 may depend on at least one variable characteristic P6.

By variable characteristic P6 there can be understood in particular:

the focal length of the optical system, the redimensioning applied to the image (digital zoom factor: enlargement of part of the image; and/or undersampling: reduction of the number of pixels of the image), the nonlinear brightness correction, such as the gamma correction, the enhancement of contour, such as the level of deblurring applied by appliance P25, the noise of the sensor and of the electronic unit, the aperture of the optical system, the focusing distance, the number of the frame on a film, the underexposure or overexposure, the sensitivity of the film or sensor, the type of paper used in a printer, the position of the center of the sensor in the image, the rotation of the image relative to the sensor, the position of a projector relative to the screen, the white balance used, the activation of a flash and/or its power, the exposure time, the sensor gain, the compression, the contrast, another adjustment applied by the user of appliance P25, such as a mode of operation, another automatic adjustment of appliance P25, another measurement performed by appliance P25.

In the case of a restitution means 19, the variable characteristic P6 can also be defined as variable restitution characteristic.

Variable Characteristic Value

On the basis of FIG. 13, a description will now be given of the concept of variable characteristic value P26. A variable characteristic value P26 is defined as the value of variable characteristic P6 at the moment of capture, modification or restitution of a specified image, such value being obtained, for example, from data in Exif format present in file P100. Image-processing means P1 can then process or modify the quality of image 103 as a function of variable characteristics P6, by using formatted information 15 that depends on variable characteristics P6 and by determining the value P26 of the variable characteristics.

In the case of a restitution means 19, the value of variable characteristic P6 can also be defined as a variable restitution characteristic.

Measured Formatted Information, Extended Formatted Information

As illustrated in FIG. 15, the formatted information 15 or a fraction of the formatted information 15 can include measured formatted information P101 to illustrate a raw measurement, such as a mathematical field related to geometric distortion defects at a certain number of characteristic points of an array 80. As illustrated in FIG. 15, the formatted information 15 or a fraction of the formatted information 15 can include extended formatted information P102, which can be calculated from measured formatted information P101, for example by interpolation for real points other than the characteristic points of array 80. In the foregoing, it has been seen that a formatted information item 15 might depend on variable characteristics P6. According to the invention, a combination P120 is defined as a combination composed of variable characteristics P6 and of values P26 of variable characteristics, an example being a combination P120 composed of the focal length, of the focusing, of the diaphragm aperture, of the capture speed, of the aperture, etc. and of associated values. It is difficult to imagine how the formatted information 15 related to different combinations P120 can be calculated, all the more so because certain characteristics of combination P120, such as the focal length and the distance, can vary continuously.

The invention provides for calculating the formatted information 15 in the form of extended formatted information P102 by interpolation from measured formatted information P101 related to a predetermined selection of combinations P120 of known variable characteristics P6.

For example, measured formatted information P101 related to the combination P120 of "focal length=2, distance=7, capture speed=1/100", to the combination of "focal length=10, distance=7, capture speed=1/100" and to the combination of "focal length=50, distance=7, capture speed=1/100" is used to calculate extended formatted information P102 that depends on focal length as the variable characteristic P6. By means of this extended formatted information P102, it is possible in particular to determine formatted information related to the combination of "focal length=25, distance=7 and capture speed=1/100".

The measured formatted information P101 and the extended formatted information P102 may exhibit an interpolation deviation P121. The invention may include the stage of selecting zero or one or more variable characteristics P6, such that interpolation deviation P121 for the extended formatted information P102 obtained for the variable characteristics P6 selected in this way is smaller than a predetermined interpolation threshold. In fact, certain variable characteristics P6 may have a smaller influence than others on the defect P5, and the error introduced by making the approximation that these are constant may merely be minimum; for example, the focusing adjustment may have merely a slight influence on the vignetting defect, and for this reason may not be part of the variable characteristics P6 selected. The variable characteristics P6 may be selected at the moment of production of the formatted information 15. It results from the combination of technical features that the modification of image quality employs simple calculations. It also results from the combination of technical features that the extended formatted information P102 is compact. It also results from the combination of technical features that the eliminated variable characteristics P6 have the least influence on the defect P5. It results from the combination of technical features that image quality can be modified with specified precision by means of the formatted information 15.

In the case of a restitution means 19, the combination 120 may also be defined as a restitution combination.

In the case of a restitution means 19, the measured formatted information P101 may also be defined as measured formatted restitution information.

In the case of a restitution means 19, the extended formatted information P102 may also be defined as extended formatted restitution information.

In the case of a restitution means 19, the interpolation deviations P121 may also be defined as interpolation restitution deviations.

Parameterizable Model, Parameters

Referring in particular to FIGS. 5, 6 and 16, a description will now be given of the concept of parameters P9 and parameterizable model P10. Within the meaning of the invention, a parameterizable model P10 is defined as a mathematical model that may depend on variables P6 and that may be related to one or more defects P5 of one or more appliances P25; parameterizable transformation model 12, parameterizable reverse transformation model 212, parameterizable restitution transformation model 97 and parameterizable restitution transformation model 297 described hereinabove are examples of parameterizable models P10; for example, a parameterizable model P10 may be related to:
sharpness defects or blurring of a digital photo appliance,
geometric vignetting defects of a photo appliance which it is hoped can be emulated,
geometric distortion defects and geometric chromatic aberration defects of a projector,
sharpness or blurring defects of a disposable photo appliance combined with a scanner.

The formatted information 15 related to a defect P5 of an appliance P25 may be presented in the form of the parameters P9 of a parameterizable model P10 depending on variable characteristics P6; by means of the parameters P9 of parameterizable model P10, it is possible to identify a mathematical function P16 in a set of mathematical functions, such as multi-variable polynomials; by means of the mathematical functions P16, it is possible to modify image quality as a function of specified values of the variables P6.

In such a way that image-processing means P1 can use the parameters P9 of parameterizable transformation model P10 to calculate the modified image, for example to calculate the corrected intensity or the corrected restitution intensity of a point of the image.

Color Plane

Referring in particular to FIG. 15, a description will now be given of the concept of color plane P20 of a colored image 103. Image 103 can be decomposed into color planes P20 in various ways: number of planes (1, 3 or more), precision (8 bits unsigned, 16 bits signed, floating, etc.) and significance of the planes (relative to a standard color space). Image 103 can then be decomposed in various ways into color planes, P20: red color plane composed of red pixels, green color plane, blue color plane (RGB) or brightness, saturation, hue, etc.; on the other hand, color spaces such as PIM exist, or negative pixel values are possible in order to permit representation of subtractive colors, which cannot be represented in positive RGB; finally, it is possible to encode a pixel value on 8 bits or 16 bits, or by using floating values. As an example of how the formatted information 15 may be related to the color planes P20, the sharpness defects can be characterized differently for the planes of red, green and blue color, to permit image-processing means P1 to correct the sharpness defect differently for each color plane P20.

Provision of the Formatted Information

On the basis in particular of FIGS. 8, 13, 15 and 16, a description will now be given of an alternative embodiment of the invention. To provide formatted information 15 in a standard format to image-processing means P1, the system includes data-processing means and the method includes the stage of filling in at least one field 91 of the standard format with the formatted information 15. Field 91 may then contain in particular:
  values related to the defects P5, for example in the form of parameters P9, in such a way that image-processing means P1 can use the parameters P9 to modify image quality by taking the defects P5 into account, and/or
  values related to the sharpness defects, for example in the form of parameters P9, in such a way that image-processing means P1 can use the parameters P9 to modify image quality by taking the sharpness defects into account, and to calculate the corrected shape or the corrected restitution shape of a point of the image, and/or
  values related to the colorimetry defects, for example in the form of parameters P9, in such a way that image-processing means P1 can use the parameters P9 to modify image quality by taking the colorimetry defects into account, and to calculate the corrected color or the corrected restitution color of a point of the image, and/or
  values related to the geometric distortion defects and/or to the geometric chromatic aberration defects, for example in the form of parameters P9, in such a way that image-processing means P1 can use the parameters P9 to modify image quality by taking the geometric distortion defects and/or the geometric chromatic aberration defects into account, and to calculate the corrected position or the corrected restitution position of a point of the image, and/or
  values related to the geometric vignetting defects, for example in the form of parameters P9, in such a way that image-processing means P1 can use the parameters P9 to modify image quality by taking the geometric vignetting defects into account, and to calculate the corrected intensity or the corrected restitution intensity of a point of the image, and/or
  values related to the deviations 14, and/or
  values that are functions of variable characteristics P6 depending on image 103, for example the polynomial coefficients and terms which depend on the variable characteristic P6 corresponding to the focal length and with which it is possible to calculate the corrected intensity of a point of the image as a function of its distance from the center, in such a way that the image-processing means can calculate the corrected intensity of a point for any value of focal length of the image-capture appliance at the moment at which image 103 was captured,
  values related to formatted information related to the color planes P20,
  values related to formatted information,
  values related to measured formatted information.
  values related to extended formatted information.

Production of Formatted Information

On the basis in particular of FIGS. 7, 12 and 17, a description will now be given of an alternative embodiment of the invention. To produce formatted information 15 related to the defects P5 of the appliances P25 of an appliance chain P3, the invention can employ data-processing means and the first algorithm and/or second algorithm and/or third algorithm and/or fourth algorithm and/or fifth algorithm and/or sixth algorithm and/or seventh algorithm and/or eighth algorithm as described hereinabove.

Application of the Invention to Cost Reduction

Cost reduction is defined as a method and system for lowering the cost of an appliance P25 or of an appliance chain P3, especially the cost of the optical system of an appliance or of an appliance chain, the method consisting in:
  reducing the number of lenses, and/or
  simplifying the shape of the lenses, and/or
  designing an optical system having defects P5 that are larger than those desired for the appliance or the appliance chain, or choosing the same from a catalog, and/or
  using materials, components, processing operations or manufacturing methods that are less costly for the appliance or the appliance chain and that add defects.

The method and system according to the invention can be used to lower the cost of an appliance or of an appliance chain: it is possible to design a digital optical system, to produce formatted information related to the defects of the appliance or of the appliance chain, to use this formatted information to enable image-processing means P1, whether they are integrated or not, to modify the quality of images derived from or addressed to the appliance or to the appliance chain, in such a way that the combination of the appliance or the appliance chain with the image-processing means is capable of capturing, modifying or restituting images of the desired quality at reduced cost.

The invention claimed is:
1. A method for producing formatted information related to defects of appliances of at least two appliance chains, addressed to an image-processor for modifying quality of images processed by the image-processor, each appliance chain including at least one image-capture appliance, at least one image-restitution appliance, or a combination thereof, the method comprising:
  producing data of the formatted information according to a standard format, characterizing the defects of the appliances of each appliance chain, and
  storing the formatted information in a database, wherein
  at least one image-capture appliance is provided with at least one variable characteristic depending on the image, fractions of the formatted information being related to the defects of the at least one image-capture appliance, each variable characteristic being configured to be associated with a value to form a combination including the set of the variable characteristics and of the values, the method further including
  producing a first fraction of the formatted information for a predetermined selection of the combinations, the first fraction of the formatted information being entered in a field of the formatted information as measured formatted information, and obtaining a second fraction of the formatted information related to an arbitrary combination from the measured formatted information, as extended formatted information, the formatted information including the extended formatted information in place of the measured formatted information.

2. The method according to claim 1 further comprising:
producing data characterizing the defects of the at least one image-capture appliance, the formatted information including the data characterizing the defects of the at least one image-capture appliance.

3. The method according to claim 2, further comprising:
calculating the formatted information, employing a first algorithm which enables selection of items within a set of parameterizable transformation models, within a set of parameterizable reverse transformation models, within a set of synthetic images, within a set of reference scenes, and within a set of transformed images, the items including
a reference scene, and/or
a transformed image, and/or
a parameterizable transformation model with which a reference image obtained by capturing the reference scene by the image-capture appliance can be transformed to the transformed image, and/or
a parameterizable reverse transformation model with which the transformed image can be transformed to the reference image, and/or
a synthetic image obtained from the reference scene and/or from the reference image, such that the transformed image is close to the synthetic image, the transformed image exhibiting a deviation compared with the synthetic image, and the formatted information including parameters of the chosen parameterizable transformation model and/or of parameters of the chosen parameterizable reverse transformation model.

4. The method according to claim 3, wherein the first calculation algorithm enables selection within a set of mathematical projections, of a mathematical projection with which the synthetic image can be constructed from the reference scene.

5. The method according to claim 2, further comprising:
calculating the formatted information employing a second algorithm including
choosing at least one reference scene,
capturing at least one reference image of each reference scene by the at least one image-capture appliance, and
choosing items within a set of parameterizable transformation models and within a set of synthetic images, the items including
a parameterizable transformation model with which the reference image can be transformed to a transformed image, and/or
a synthetic image obtained from the reference scene and/or obtained from the reference image, such that the synthetic image is close to the transformed image, the transformed image exhibiting a deviation compared with the synthetic image, and the formatted information including parameters of the chosen parameterizable transformation model and/or of parameters of the chosen parameterizable reverse transformation model, the parameterizable reverse transformation model permitting the transformed image to be transformed to the reference image.

6. The method according to claim 5, wherein the second calculation algorithm enables selection within a set of mathematical projections, of a mathematical projection with which the synthetic image can be constructed from the reference scene.

7. The method according to claim 3, further comprising:
calculating the deviations using a third algorithm including
calculating the deviations between the transformed image and the synthetic image, and
associating the deviations with the formatted information.

8. The method according to claim 2, further comprising:
calculating the formatted information employing a fourth algorithm including
constructing a synthetic-image class by specified mathematical projections of at least one reference scene onto a surface,
capturing at least one reference image of each reference scene by the at least one image-capture appliance, and
selecting within a set of parameterizable transformation models, that with which the reference image can be transformed to a transformed image close to the synthetic-image class of the reference scene, the transformed image exhibiting a deviation compared with the synthetic-image class, and the formatted information including the parameters of the chosen parameterizable transformation models.

9. The method according to claim 8, further comprising:
calculating the deviations employing a fifth algorithm including
calculating the deviations between the transformed image and the synthetic-image class, and
associating the deviations with the formatted information.

10. The method according to claim 1, wherein the measured formatted information and the extended formatted information exhibit an interpolation deviation, the method further comprising:
selecting at least one of the variable characteristics, such that the interpolation deviation for the extended formatted information obtained for the selected variable characteristics is below a predetermined interpolation threshold.

11. The method according to claim 1, wherein the appliance chain includes at least one image-restitution appliance, the method further comprising:
producing data characterizing the defects of the at least one image-restitution appliance, the formatted information including the data characterizing the defects of the at least one image-restitution appliance.

12. The method according to claim 11, further comprising:
calculating the formatted information employing a sixth algorithm which enables a selection of items within a set of parameterizable restitution transformation models, within a set of parameterizable reverse restitution transformation models, within a set of mathematical restitution projections, within a set of restitution references, and within a set of corrected reference restitution images, the items including
a restitution reference, and/or
a corrected reference restitution image, and/or
a parameterizable restitution transformation model with which the restitution reference can be transformed to the corrected reference restitution image, and/or a parameterizable reverse restitution transformation model with which the corrected reference restitution image can be transformed to the restitution reference, and/or a mathematical restitution projection with which a synthetic restitution image can be constructed from the corrected reference restitution image, such that the synthetic restitution image is close to the restituted reference obtained by restitution of the restitution reference by the at least one image-restitution appliance, the restituted reference exhibiting a restitution deviation compared with the synthetic restitution image, and the formatted information including the parameters of the chosen parameterizable restitution transformation model and/or of the parameters of the chosen parameterizable reverse restitution transformation model.

13. The method according to claim 11, further comprising: calculating the formatted information employing a seventh algorithm including
choosing at least one restitution reference,
restituting the restitution reference to a restituted reference by the at least one image-restitution appliance, and
choosing items, within a set of parameterizable restitution transformation models and within a set of mathematical restitution projections, the items including
a parameterizable restitution transformation model with which the restitution reference can be transformed to a corrected reference restitution image, and
a mathematical restitution projection with which a synthetic restitution image can be constructed from the corrected reference restitution image, such that the synthetic restitution image is close to the restituted reference, the restituted reference exhibiting a restitution deviation compared with the synthetic restitution image, and the formatted information including the parameters of the chosen parameterizable restitution transformation model and/or of the parameters of the parameterizable reverse restitution transformation model, the parameterizable reverse restitution transformation model permitting the corrected reference restitution image to be transformed to the restitution reference.

14. The method according to claim 11, further comprising: calculating the formatted information employing an eighth algorithm including
choosing a corrected reference restitution image, and
choosing items within a set of parameterizable restitution transformation models, within a set of mathematical restitution projections, and within a set of restitution references, the items including
a restitution reference, and/or
a parameterizable restitution transformation model with which the restitution reference can be transformed to the corrected reference restitution image, and/or
a parameterizable reverse restitution transformation model with which the corrected reference restitution image can be transformed to the restitution reference, and/or
a mathematical restitution projection with which a synthetic restitution image can be constructed from the corrected reference restitution image, such that the synthetic restitution image is close to the restituted reference obtained by restitution of the restitution reference by the image-restitution means, the restituted reference exhibiting a restitution deviation compared with the synthetic restitution image, and the formatted information including the parameters of the chosen parameterizable restitution transformation model and/or of the parameters of the chosen parameterizable reverse restitution transformation model.

15. The method according to claim 12, further comprising: calculating the restitution deviations employing a ninth algorithm including
calculating the restitution deviations between the restituted reference and the synthetic restitution image, and
associating the restitution deviations with the formatted information.

16. The method according to claim 12, wherein the at least one image-restitution appliance of the appliance chain is provided with at least one variable restitution characteristic depending on the image, fractions of the formatted information being related to the defects of the at least one image-restitution appliance, each variable restitution characteristic configured to be associated with a value to form a restitution combination including the set of the variable restitution characteristics and of the values, the method further comprising:
producing a third fraction of the formatted information for a predetermined selection of the restitution combinations, the third fraction of the formatted information being entered in a field of the formatted information as measured formatted restitution information.

17. The method according to claim 16, further comprising: obtaining a fourth fraction of the formatted information related to an arbitrary combination from measured formatted restitution information, as extended formatted restitution information, the formatted information including the extended formatted restitution information in place of the measured formatted restitution information.

18. The method according to claim 17, wherein the measured formatted restitution information and the extended formatted restitution information exhibit a restitution interpolation deviation, the method further comprising:
selecting at least one of the variable restitution characteristics, such that the restitution interpolation deviation for the extended formatted restitution information obtained for the selected at least one of the variable restitution characteristics is below a predetermined restitution interpolation threshold.

19. The method according to claim 12, wherein
the at least one image-restitution appliance is associated with the at least one image-capture appliance to restitute, in digital form, the restituted reference from the restitution reference, and
the formatted information related to the at least one image-capture appliance associated with the at least one image-restitution appliance is used.

20. The method according to claim 1, wherein each appliance chain includes at least two appliances, the method further comprising:
producing formatted information related to each of the appliances of each appliance chain, and
combining the formatted information related to each of the appliances of each appliance chain, to obtain the formatted information related to each appliance chain.

21. A system configured to produce formatted information related to defects of appliances of at least two appliance chains, addressed to an image-processor, to modify quality of images processed by the image-processor, each appliance chain including at least one image-capture appliance, at least one image-restitution appliance, or a combination thereof, the system comprising:

data-processing means for producing data of formatted information according to a standard format, characterizing the defects of the appliances of each appliance chain, and storing means for storing the formatted information in a database, wherein at least one image-capture appliance is provided with at least one variable characteristic depending on the image, fractions of the formatted information being related to the defects of the at least one image-capture appliance, each variable characteristic configured to be associated with a value to form a combination including the set of the variable characteristics and of the values, the data-processing means produces a first fraction of the formatted information for a predetermined selection of the combinations, the produced first fraction of the formatted information being entered in a field of the formatted information as measured formatted information, and the data-processing means obtains a second fraction of the formatted information related to an arbitrary combination from the measured formatted information as extended formatted information, the formatted information including the extended formatted information in place of the measured formatted information.

22. The system according to claim 21, wherein the data-processing means produces data characterizing the defects of the at least one image-capture appliance, the formatted information including the data characterizing the defects of the at least one image-capture appliance.

23. The system according to claim 22, wherein the data-processing means employs a first algorithm for calculating the formatted information, the first calculation algorithm enabling selection of items within a set of parameterizable transformation models, within a set of parameterizable reverse transformation models, within a set of synthetic images, within a set of reference scenes, and within a set of transformed images, the items including a reference scene, and/or a transformed image, and/or a parameterizable transformation model with which the reference image obtained by capturing the reference scene by the at least one image-capture appliance can be transformed to the transformed image, and/or a parameterizable reverse transformation model with which the transformed image can be transformed to the reference image, and/or a synthetic image obtained from the reference scene and/or obtained from the reference image, such that the transformed image is close to the synthetic image, the transformed image exhibiting a deviation compared with the synthetic image, and the formatted information including parameters of the chosen parameterizable transformation model and/or of parameters of the chosen parameterizable reverse transformation model.

24. The system according to claim 23, wherein the data-processing means include calculating means for selecting within a set of mathematical projections, a mathematical projection with which the synthetic image can be constructed from the reference scene.

25. The system according to claim 22, wherein the data-processing means employs a second algorithm for calculating the formatted information, and the calculating means selects at least one reference scene, the at least one image-capture appliance enabling to capture at least one reference image of each reference scene, and enables a selection of items within a set of parameterizable transformation models and within a set of synthetic images, the items including a parameterizable transformation model with which the reference image can be transformed to a transformed image, and/or a synthetic image obtained from the reference scene and/or obtained from the reference image, the choice being made such that the synthetic image is close to the transformed image, the transformed image exhibiting a deviation compared with the synthetic image, and the formatted information including the parameters of the chosen parameterizable transformation model and/or of the parameters of the chosen parameterizable reverse transformation model, the parameterizable reverse transformation model permitting the transformed image to be transformed to the said reference image.

26. The system according to claim 25, wherein the calculating means employs the second calculation algorithm to select within a set of mathematical projections, a mathematical projection with which the synthetic image can be constructed from the reference scene.

27. The system according to claim 23, wherein the data-processing means employs a third algorithm for calculating the deviations, and includes calculating means that calculate the deviations between the transformed image and the synthetic image, and associate the deviations with the formatted information.

28. The system according to claim 22, wherein the system includes at least one reference scene, the at least one image-capture appliance is configured to construct a reference image for each reference scene, the system further comprising calculating and processing means that construct a synthetic-image class by specified mathematical projections of at least one reference scene onto a surface, and select from within a set of parameterizable transformation models, that with which the reference image can be transformed to a transformed image close to the synthetic-image class of the reference scene, the transformed image exhibiting a deviation compared with the synthetic-image class, and the formatted information including the parameters of the chosen parameterizable transformation models.

29. The system according to claim 28, wherein the calculating means calculate the deviations between the transformed image and the synthetic-image class, and associate the deviations with the formatted information.

30. The system according to claim 21, wherein the measured formatted information and the extended formatted information exhibit an interpolation deviation, the system further comprising:

selection means for selecting at least one of the variable characteristics, such that the interpolation deviation for the extended formatted information obtained for the variable characteristics selected is below a predetermined interpolation threshold.

31. The system according to claim 21, wherein
each appliance chain includes at least one image-restitution appliance, the formatted information being related to the defects of the at least one image-restitution appliance, and
the data-processing means produces data characterizing the defects of the at least one image-restitution appliance, the formatted information including the data characterizing the defects of the image-restitution appliance.

32. The system according to claim 31, further comprising:
calculating means for selecting items within a set of parameterizable restitution transformation models, within a set of parameterizable reverse restitution transformation models, within a set of mathematical restitution projections, within a set of restitution references, and within a set of corrected reference restitution images, the items including
a restitution reference, and/or
a corrected reference restitution image, and/or
a parameterizable restitution transformation model with which the restitution reference can be transformed to the corrected reference restitution image, and/or
a parameterizable reverse restitution transformation model with which the corrected reference restitution image can be transformed to the restitution reference, and/or
a mathematical restitution projection with which a synthetic restitution image can be constructed from the corrected reference restitution image, the choice being made such that the synthetic restitution image is close to the restituted reference obtained by restitution of the restitution reference by the at least one image-restitution appliance, the restituted reference exhibiting a restitution deviation compared with the synthetic restitution image, and the formatted information including the parameters of the chosen parameterizable restitution transformation model and/or of the parameters of the chosen parameterizable reverse restitution transformation model.

33. The system according to claim 31, wherein
the calculating means selects at least one restitution reference, and
the image-restitution appliance is configured to restitute the restitution reference to a restituted reference, and to enable a selection of items within a set of parameterizable restitution transformation models and within a set of mathematical restitution projections, the items including
a parameterizable restitution transformation model with which the restitution reference can be transformed to a corrected reference restitution image, and
a mathematical restitution projection with which a synthetic restitution image can be constructed from the corrected reference restitution image, the choice being made such that the synthetic restitution image is close to the restituted reference, the restituted reference exhibiting a restitution deviation compared with the synthetic restitution image, and the formatted information including the parameters of the chosen parameterizable restitution transformation model and/or of the parameters of the parameterizable reverse restitution transformation model, the parameterizable reverse restitution transformation model permitting the corrected reference restitution image to be transformed to the said restitution reference.

34. The system according to claim 31, wherein
the calculating means selects a corrected reference restitution image, and enables selection of items within a set of parameterizable restitution transformation models, within a set of mathematical restitution projections, and within a set of restitution references, the items including
a parameterizable restitution transformation model with which a specified restitution reference can be transformed to the corrected reference restitution image, and/or
a parameterizable reverse restitution transformation model with which the corrected reference restitution image can be transformed to the restitution reference, and/or
a mathematical restitution projection with which a synthetic restitution image can be constructed from the corrected reference restitution image, the choice being made such that the synthetic restitution image is close to the restituted reference obtained by restitution of the restitution reference by the at least one image-restitution appliance, the restituted reference exhibiting a restitution deviation compared with the synthetic restitution image, and the formatted information including the parameters of the chosen parameterizable restitution transformation model and/or of the parameters of the chosen parameterizable reverse restitution transformation model.

35. The system according to claim 32, wherein the calculating means
calculates the restitution deviations between the restituted reference and the synthetic restitution image, and
associates the restitution deviations with the formatted information.

36. The system according to claim 32, wherein
the at least one image-restitution appliance is provided with at least one variable restitution characteristic depending on the image, fractions of the formatted information being related to the defects of the at least one image-restitution appliance, each variable restitution characteristic configured to be associated with a value to form a restitution combination including the set of the variable restitution characteristics and of the values, and
the data-processing means produces a third fraction of the formatted information for a predetermined selection of the restitution combinations, the produced third fraction of the formatted information being entered in a field of the formatted information as the measured formatted restitution information.

37. The system according to claim 36, wherein
the data-processing means obtains a fourth fraction of the formatted information related to an arbitrary combination from measured formatted restitution information, the fourth fraction of the formatted information related to an arbitrary restitution combination as extended formatted restitution information, and the formatted information including the extended formatted restitution information in place of the measured formatted restitution information.

38. The system according to claim 37, wherein the measured formatted restitution information and the extended formatted restitution information exhibit a restitution interpolation deviation, the system further comprising:
selection means for selecting at least one of the variable restitution characteristics, such that the restitution interpolation deviation for the extended formatted restitution information obtained for the at least one variable restitution characteristics selected is below a predetermined restitution interpolation threshold.

39. The system according to claim 32, wherein
the at least one restitution appliance is associated with the at least one image-capture appliance to restitute, in digital form, the restituted reference from the restitution reference, and
the data-processing means produces the formatted information related to the defects of the at least one restitution appliance by using the formatted information related to the at least one image-capture appliance associated with the at least one restitution appliance.

40. The system according to claim 21, wherein
each appliance chain includes at least two appliances to produce formatted information related to the defects of the appliances of each appliance chain, and
the data-processing means produces the formatted information related to each of the appliances of each appliance chain and combines the formatted information related to each of the appliances of each appliance chain, to obtain the formatted information related to each appliance chain.

41. The method according to claim 1, wherein the database is within one of said appliance chains.

42. The method according to claim 1, wherein the database is within a remote server.

43. The method according to claim 1, wherein the defects to be corrected comprise at least one of:
geometric defects, sharpness defects, colorimetric defects, geometric distortion defects, geometric chromatic aberration defects, geometric vignetting defects, contrast defects, defects of flash uniformity, sensor noise, grain, astigmatism defects, and spherical aberration defects.

* * * * *